US012327045B2

(12) United States Patent
Jayaram Masti et al.

(10) Patent No.: US 12,327,045 B2
(45) Date of Patent: Jun. 10, 2025

(54) SYSTEM, APPARATUS, AND METHOD FOR SCHEDULING METADATA REQUESTS

(71) Applicant: Intel Corporation, Santa Clara, CA (US)

(72) Inventors: Ramya Jayaram Masti, Hillsboro, OR (US); Thomas Toll, Portland, OR (US); Adrian C. Moga, Portland, OR (US); Vincent Von Bokern, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 17/213,700

(22) Filed: Mar. 26, 2021

(65) Prior Publication Data

US 2022/0308791 A1    Sep. 29, 2022

(51) Int. Cl.
*G06F 3/06* (2006.01)
*G06F 9/50* (2006.01)

(52) U.S. Cl.
CPC .......... *G06F 3/0659* (2013.01); *G06F 3/0611* (2013.01); *G06F 3/0673* (2013.01); *G06F 9/5005* (2013.01)

(58) Field of Classification Search
CPC .. G06F 13/1663; G06F 3/0611; G06F 3/0659; G06F 3/0673; G06F 9/5005
See application file for complete search history.

(56) References Cited

U.S. PATENT DOCUMENTS

2011/0276974 A1\* 11/2011 Chung ................ G06F 13/1689
                                                      711/E12.001
2022/0214832 A1\* 7/2022 BenHanokh .......... G06F 3/0611

OTHER PUBLICATIONS

European Patent Office, Office Action mailed Aug. 9, 2022 in European Patent Application No. 22158063.2 (9 pages).
European Patent Office, Communication Pursuant to Article 94(3) EPC dated Jul. 4, 2023 in European Patent Application No. 22158063.2 (4 pages).
European Patent Office, Communication Pursuant to Article 94(3) EPC dated Mar. 5, 2024 in European Patent Application No. 22158063.2 (7 pages).

\* cited by examiner

*Primary Examiner* — Yong J Choe
(74) *Attorney, Agent, or Firm* — Nicholson De Vos Webster & Elliott LLP

(57) ABSTRACT

In one embodiment, an apparatus includes a memory and a scheduler. The scheduler is coupled to the memory and a memory controller. The memory stores a plurality of metadata requests. Each of the plurality of metadata requests is associated with one of a plurality of metadata priority levels. The scheduler schedules transmission of a first metadata request of the plurality of metadata requests to the memory controller based at least in part on a first metadata priority level associated with the first metadata request and a first bandwidth portion of a metadata request bandwidth. The first bandwidth portion is associated with the first metadata priority level. Other embodiments are described and claimed.

17 Claims, 14 Drawing Sheets

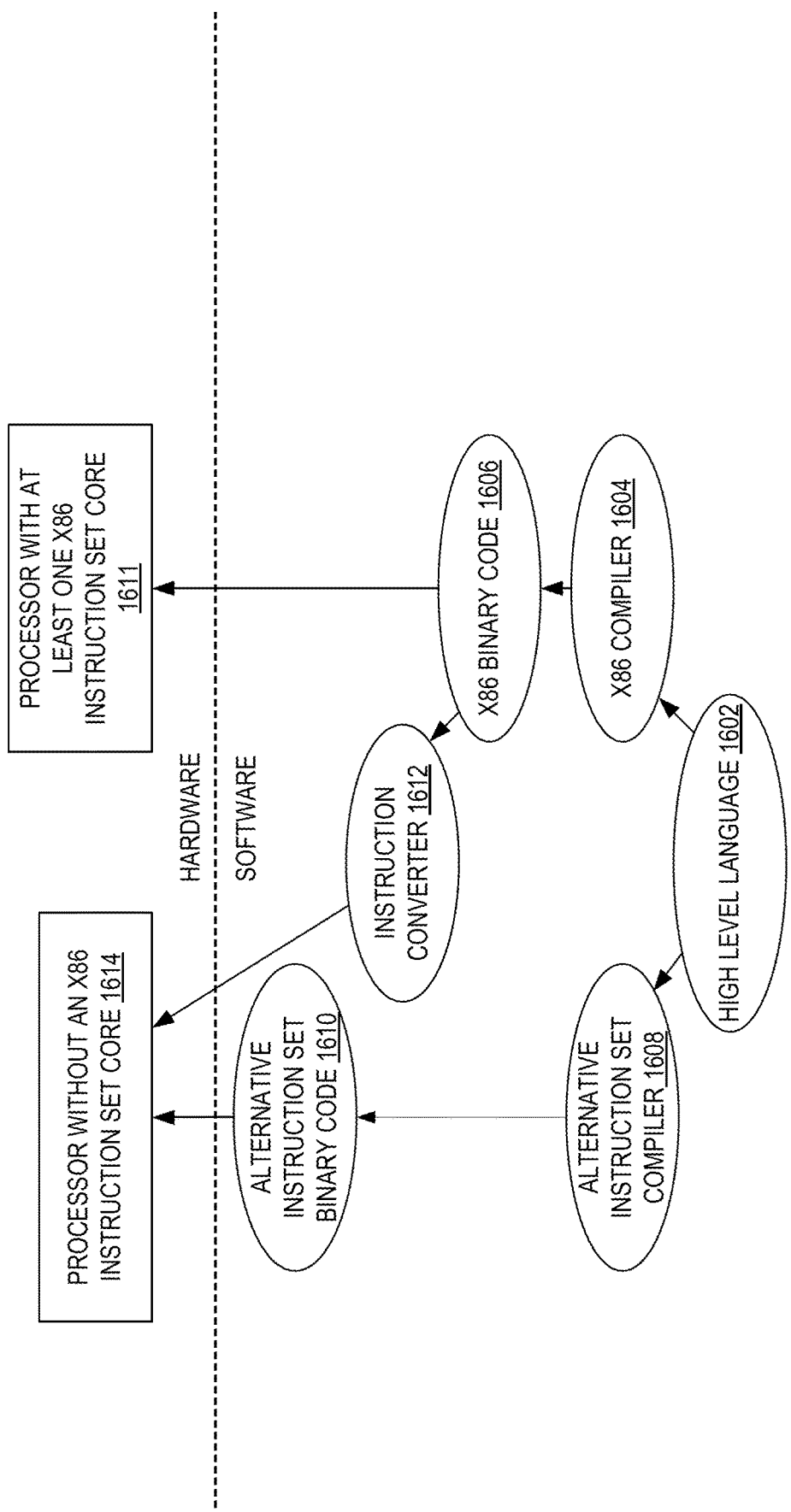

SYSTEM, APPARATUS, AND METHOD FOR SCHEDULING METADATA REQUESTS

TECHNICAL FIELD

Embodiments relate to data communications in a computer system.

BACKGROUND

A computing platform typically includes multiple threads or cores. Data transactions generated by the different cores often have different priority levels. Examples of data transactions include read data transactions and write data transactions. All data transactions are associated with metadata. The metadata typically includes auxiliary and/or secondary information regarding user code or data associated with the data transaction. An example of metadata is security metadata including, but not limited to, memory safety tags, access permissions, memory encryption information, and integrity information. The metadata is often stored in a sequestered portion of a memory hosted by a memory controller.

BRIEF DESCRIPTION OF THE DRAWINGS

FIG. 16 is a block diagram contrasting the use of a software instruction converter to convert binary instructions in a source instruction set to binary instructions in a target instruction set according to embodiments.

DETAILED DESCRIPTION

Figure 1:
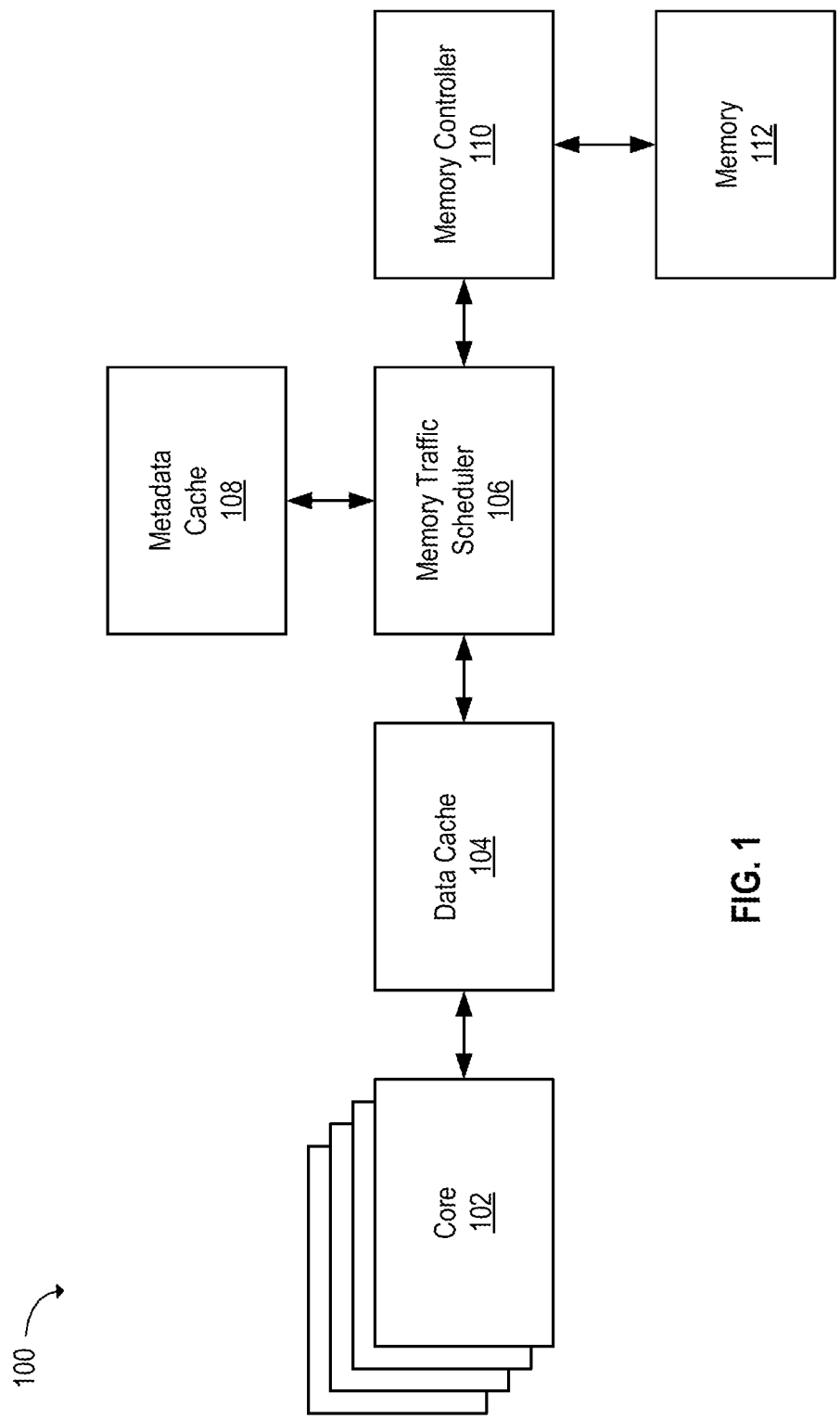
FIG. 1 is a block diagram representation of an embodiment of a system including a memory traffic scheduler.

When a core of a plurality of cores at a computing platform generates a data transaction, such as for example, a read data transaction or a write data transaction, the data transaction may be associated with metadata. The metadata typically includes auxiliary and/or secondary information regarding user code or data associated with the data transaction. The metadata is stored in a memory hosted by a memory controller.

The computing platform may include a metadata cache that is associated with the memory controller and is shared by the cores. The metadata cache is typically located close to the memory controller and stores a subset of the metadata stored in the memory. When access to user code and/or data triggers access to metadata associated with a data transaction, the metadata is fetched from the memory and the fetched metadata is stored at the metadata cache. The metadata stored at the metadata cache is available to service future requests for that metadata.

A memory traffic scheduler manages the scheduling of memory access requests to the memory controller. The memory controller retrieves data from the memory in accordance with the memory access request. Memory access requests include read data transactions, write data transactions, and metadata requests.

Different data transactions are associated with different data transaction priority levels or Quality of Service (QoS) classes. The metadata associated with a data transaction inherits the data transaction priority level as the metadata priority level. Upon the receipt of a data transaction from a core, the memory traffic scheduler checks to see if the metadata associated with the data transaction is present in the metadata cache. If the metadata is not present in the metadata cache, the memory traffic scheduler generates a metadata request for transmission to the memory controller to retrieve the metadata from the memory. The memory traffic scheduler determines whether the metadata request is one of a high priority metadata request or a low priority metadata request based on the QoS class associated with the parent data transaction.

The memory traffic scheduler schedules the transmission of the memory access requests to the memory controller by partitioning memory bandwidth, also referred to as memory access bandwidth, among different classes of memory traffic based on their priority. A first portion of the memory access bandwidth is allocated for the transmission of read data transactions, a second portion of the memory access bandwidth is allocated for the transmission of write data transactions, and a third portion of the memory access bandwidth is allocated for the transmission of metadata requests. The portion of the memory access bandwidth allocated for the transmission of metadata requests is further divided into a high priority metadata bandwidth and a low priority metadata bandwidth. The high priority metadata bandwidth is allocated for the transmission of high priority metadata requests and the low priority metadata bandwidth is allocated for the transmission of low priority metadata requests. The low priority metadata bandwidth is less than the high priority metadata bandwidth.

The memory traffic scheduler schedules the transmission of the high priority metadata requests based on the high priority metadata bandwidth and the order in which the high priority metadata requests arrive at the memory traffic scheduler and schedules the transmission of the low priority metadata requests based on the low priority metadata bandwidth and the order in which the low priority metadata requests arrive at the memory traffic scheduler.

Referring to FIG. 1, a block diagram representation of an embodiment of a system 100 including a memory traffic scheduler 106 is shown. The system 100 may be at least a portion of, for example, a server computer, a desktop computer, or a laptop computer. The system 100 includes at least one core 102, a data cache 104, the memory traffic scheduler 106, a metadata cache 108, and a memory controller 110, and a memory 112. The system 100 may include additional components that facilitate operation of the system 100. While one configuration of the system 100 is shown, alternative embodiments may include alternative configurations of a system including a memory traffic scheduler 106.

Among other functions that may be performed by the cores 102, each of the cores 102 is configured to generate data transactions. Examples of data transactions include read data transactions and write data transactions. In an embodiment, each of the cores 102 is configured to generate data transactions including a data transaction priority tag. The data transaction priority tag associated with a data transaction defines a data transaction priority level of that data transaction. In an embodiment, the data transaction priority levels include a high data transaction priority level and a low data transaction priority level. In alternative embodiments, the data transaction priority levels may include additional data transaction priority levels.

In an embodiment, each of the cores 102 is configured to generate data transactions having a specific data transaction priority level. The core identifier of each of the cores 102 is associated with the specific data transaction priority level. In an embodiment, the system 100 may include two cores 102 where a first one of the two cores 102 is configured to generate data transactions having a high data transaction priority level and a second one of the two cores 102 is configured to generate data transactions having a low data transaction priority level. The core identifier of the first core 102 is associated with data transactions having a high data transaction priority level and the second core identifier of a second core 102 is associated with data transactions having a low data transaction priority level. While an embodiment including two cores 102 and two data transaction priority levels has been described, alternative embodiments may include more than two cores and more than two data transaction priority levels.

The one or more cores 102 are communicatively coupled to the data cache 104. The data cache 104 stores a subset of data stored at the memory 112. When a core 102 generates a read data transaction for data, the data is fetched from the memory 112. The fetched data is stored in the data cache 104 and is available for future requests for the data in future read data transactions generated by one of the cores 102.

The memory traffic scheduler 106 is communicatively coupled to the one or more cores 102. In an embodiment, the memory traffic scheduler 106 is communicatively coupled to the one or more cores 102 via the data cache 104. The memory traffic scheduler 106 is communicatively coupled to the memory controller 110 and to the metadata cache 108. The memory controller 110 is communicatively coupled to the memory 112. The memory 112 is hosted by the memory controller 110.

In an embodiment, each read data transaction is associated with metadata. In an embodiment some of the read data transactions are associated with metadata. In an embodiment, each write data transaction is associated with metadata. In an embodiment some of the write data transactions are associated with metadata. In an embodiment, each data transaction, including read data transactions and write data transactions, is associated with metadata. In an embodiment some of the data transactions are associated with metadata. The metadata includes auxiliary and/or secondary information regarding user code or data associated with a data transaction. An example of metadata is security metadata including, but not limited to, memory safety tags, access permissions, memory encryption information, and integrity information. In an embodiment, the metadata is stored in a sequestered portion of the memory 112.

The metadata cache 108 is configured to store a subset of the metadata stored in memory 112. In an embodiment, the metadata cache 108 is disposed close to the memory traffic scheduler 106. In an embodiment, the metadata cache 108 is disposed close to the memory controller 110. The metadata cache 108 is shared by the cores 102. When access to user code and/or data triggers access to metadata associated with a data transaction, the memory traffic scheduler 106 is configured to schedule a metadata request transmission to the memory controller 112. The memory controller 110 is configured to fetch the metadata from the memory 112. The fetched metadata is stored in the metadata cache 108 and is available to service future requests for that metadata.

The memory traffic scheduler 106 is configured to schedule memory access requests for transmission to the memory controller 110. The memory access requests include read data transactions, write data transactions, and metadata requests. The memory traffic scheduler 106 is configured to transmit the memory access requests to the memory controller 110 by partitioning memory bandwidth, also referred to as memory request access bandwidth, among the different classes of memory traffic. For example, the memory request access bandwidth includes a read data transaction bandwidth, a write data transaction bandwidth, and a metadata bandwidth. The memory traffic scheduler 106 is configured to allocate the read data transaction bandwidth for the transmission of read data transactions, the write data transaction bandwidth for transmission of write data transactions, and the metadata bandwidth for transmission of metadata requests. In an embodiment, the memory traffic scheduler 106 is configured to schedule the transmission of the write data transactions via the write data transaction bandwidth in the order that the write data transactions were received at the memory traffic scheduler 106 and to schedule the transmission of the read data transactions via the read data transaction bandwidth in the order that the read data transactions were received at the memory traffic scheduler 106.

The metadata bandwidth includes a high priority metadata bandwidth and a low priority metadata bandwidth. In an embodiment, the metadata bandwidth is partitioned into a high priority metadata bandwidth and a low priority metadata bandwidth. The memory traffic scheduler 106 is configured to allocate the high priority metadata bandwidth for the transmission of high priority metadata requests and the low priority metadata bandwidth for the transmission of low priority metadata requests. The low priority metadata bandwidth is typically less than the high priority metadata bandwidth. In an embodiment, the memory traffic scheduler 106 is configured to schedule the transmission of the high priority metadata requests based on the high priority metadata bandwidth and the order that the high priority metadata requests were received at the memory traffic scheduler 106 and to schedule the transmission of the low priority metadata requests based on the low priority metadata bandwidth and the order that the low priority metadata requests were received at the memory traffic scheduler 106.

In an embodiment, the portion of the metadata bandwidth designated as the high priority metadata bandwidth and the portion of the metadata bandwidth designated as the low priority metadata bandwidth are defined by a user. In an embodiment, the portion of the metadata bandwidth designated as the high priority metadata bandwidth the portion of the metadata bandwidth designated as the low priority metadata bandwidth are dynamically adjusted based on the portion of the metadata requests that are high priority metadata requests and the portion of the metadata requests that are low priority metadata requests. In an embodiment, each of the high priority metadata requests may be associated with a high priority sub-level and each of the low priority metadata requests may be associated with a low priority sub-level. The high priority metadata high bandwidth may be partitioned into multiple high priority sub-level metadata bandwidths where each of the high priority sub-level metadata bandwidths is allocated for transmission of metadata requests associated with the same associated metadata high priority sub-level. Similarly, the low priority metadata high bandwidth may be partitioned into multiple low priority sub-level metadata bandwidths where each of the low priority sub-level metadata bandwidths is allocated for transmission of metadata requests associated with the same associated metadata low priority sub-level. In alternative embodiments, the metadata bandwidth may include more than two metadata priority level bandwidths, where each of the metadata priority bandwidths is allocated for the transmission of metadata requests having a specific metadata priority level.

In an embodiment, the read data transaction bandwidth includes a high priority read data transaction bandwidth and a low priority read data transaction bandwidth. In an embodiment, the read data transaction bandwidth is partitioned into a high priority read data transaction bandwidth and a low priority read data transaction bandwidth. The memory traffic scheduler 106 is configured to allocate the high priority read data transaction bandwidth for the transmission of high priority read data transactions and the low priority read data transaction bandwidth for the transmission of low priority read data transactions. The low priority read data transaction bandwidth is typically less than the high priority read data transaction bandwidth. In an embodiment, the memory traffic scheduler 106 is configured to schedule the transmission of the high priority read data transactions based on the high priority read data transaction bandwidth and the order in which the high priority read data transactions were received at the memory traffic scheduler 106 and to schedule the transmission of the low priority read data transactions based on the low priority read data transaction bandwidth and the order in which the low priority read data transaction were received at the memory traffic scheduler 106.

In an embodiment, the portion of the read data transaction bandwidth designated as the high priority read data transaction bandwidth and the portion of the read data transaction bandwidth designated as the low priority read data transaction bandwidth are defined by a user. In an embodiment, the portion of the read data transaction bandwidth designated as the high priority read data transaction bandwidth the portion of the read data transaction bandwidth designated as the low priority read data transaction bandwidth are dynamically adjusted based on the portion of the read data transactions that are high priority read data transactions and the portion of the read data transactions that are low priority read data transactions. In alternative embodiments, the read data transaction bandwidth may include more than two read data transaction priority level bandwidths, where each of the read data transaction priority bandwidths is allocated for the transmission of read data transactions having a specific read data transaction priority level.

In an embodiment, the write data transaction bandwidth includes a high priority write data transaction bandwidth and a low priority write data transaction bandwidth. In an embodiment, the write data transaction bandwidth is partitioned into a high priority write data transaction bandwidth and a low priority write data transaction bandwidth. The memory traffic scheduler 106 is configured to allocate the high priority write data transaction bandwidth for the transmission of high priority write data transactions and the low priority write data transaction bandwidth for the transmission of low priority write data transactions. The low priority write data transaction bandwidth is typically less than the high priority write data transaction bandwidth. In an embodiment, the memory traffic scheduler 106 is configured to schedule the transmission of the high priority write data transactions based on the high priority write data transaction bandwidth and the order in which the high priority write data transactions were received at the memory traffic scheduler 106 and to schedule the transmission of the low priority write data transactions based on the low priority write data transaction bandwidth and the order in which the low priority write data transaction were received at the memory traffic scheduler 106.

In an embodiment, the portion of the write data transaction bandwidth designated as the high priority write data transaction bandwidth and the portion of the write data transaction bandwidth designated as the low priority write data transaction bandwidth are defined by a user. In an embodiment, the portion of the write data transaction bandwidth designated as the high priority write data transaction bandwidth the portion of the write data transaction bandwidth designated as the low priority write data transaction bandwidth are dynamically adjusted based on the portion of the write data transactions that are high priority write data transactions and the portion of the write data transactions that are low priority write data transactions. In alternative embodiments, the write data transaction bandwidth may include more than two write data transaction priority level bandwidths, where each of the write data transaction priority bandwidths is allocated for the transmission of write data transactions having a specific write data transaction priority level.

Upon the receipt of a memory request from the memory traffic scheduler 106, the memory controller 110 retrieves the data requested in the memory request from the memory 112.

Figure 2:
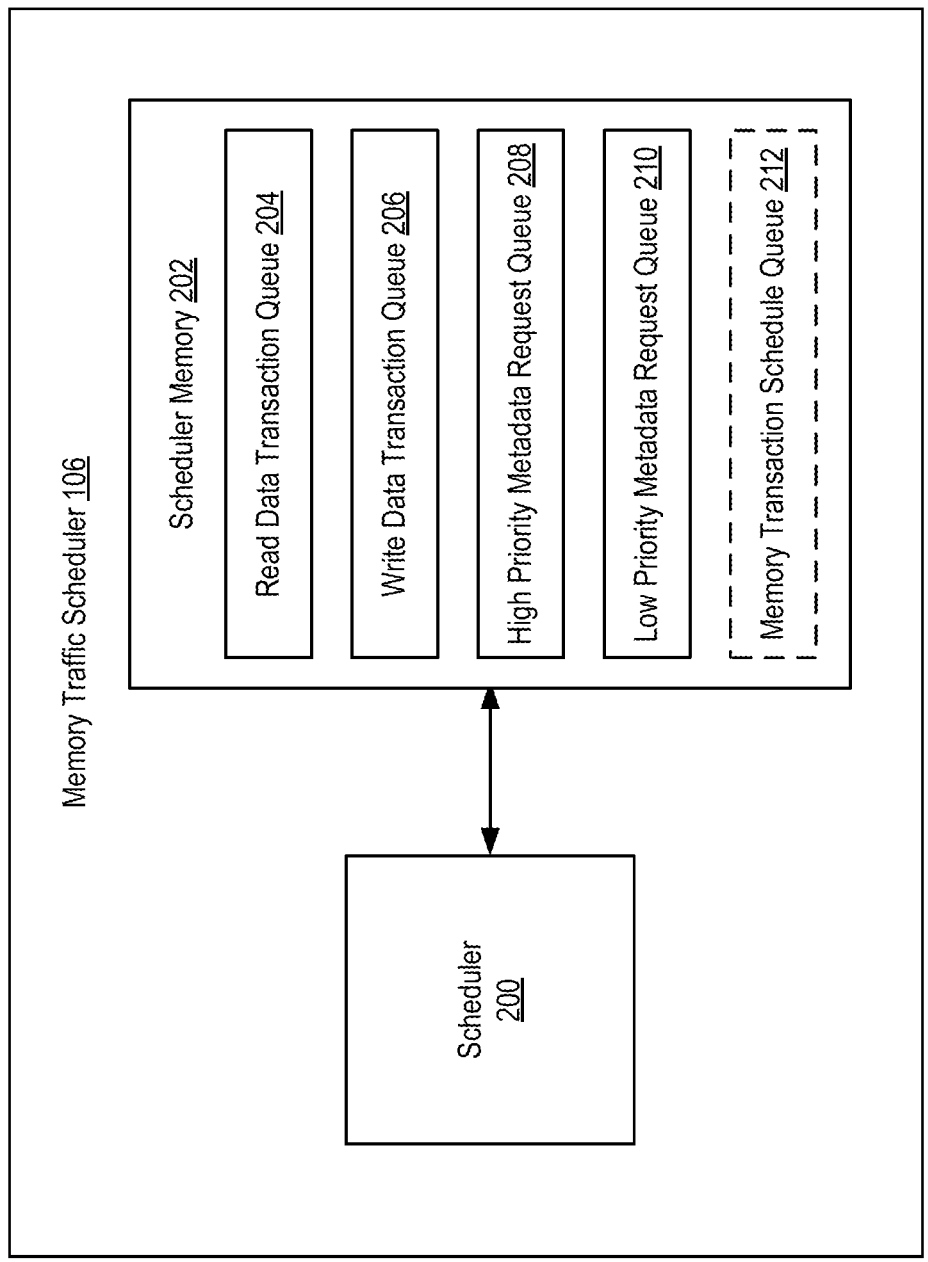
FIG. 2 is a block diagram representation of an embodiment of a memory traffic scheduler.

Referring to FIG. 2, a block diagram representation of an embodiment of a memory traffic scheduler 106 is shown. The memory traffic scheduler 106 includes a scheduler 200 communicatively coupled to a scheduler memory 202. The memory traffic scheduler 106 may include additional components that facilitate the operation of the memory traffic scheduler 106. The scheduler 200 schedules the transmission of memory access requests to the memory controller 110. The memory access requests include read data transactions, write data transactions, and metadata requests. In an embodiment, the metadata requests include high priority metadata requests and low priority metadata requests. In alternative embodiments, the metadata requests may include metadata requests associated with additional metadata priority levels.

In an embodiment, the scheduler memory 202 includes a plurality of memory access request queues. In an embodiment, the memory access request queues at the scheduler memory 202 include a read data transaction queue 204, a write data transaction queue 206, a high priority metadata request queue 208, and a low priority metadata request queue 210. In an embodiment, the read data transaction queue 204, the write data transaction queue 206, the high priority metadata request queue 208, and the low priority metadata request queue 210 are first in first out (FIFO) queues. In alternative embodiments, the scheduler memory 202 may include additional metadata request queues with each of the metadata request queues being associated with metadata requests having additional metadata priority levels.

Upon the receipt of a read data transaction from a core 102, the scheduler 200 is configured to place the read data transaction in the read data transaction queue 204. Upon the receipt of a write data transaction from a core 102, the scheduler 200 is configured to place the write data transaction in the write data transaction queue 206. If the scheduler 200 determines that there is metadata associated with a received data transaction and that the metadata is not available in the metadata cache 108, the scheduler 200 is configured to determine whether the metadata associated with the data transaction is high priority metadata or low priority metadata. Upon a determination that the metadata is high priority metadata, the scheduler 200 is configured to generate a high priority metadata request for the high priority metadata and place the high priority metadata request in the high priority metadata request queue 208. Upon a determination that the metadata is low priority metadata, the scheduler 200 is configured to generate a low priority metadata request for the low priority metadata and place the low priority metadata request in the low priority metadata request queue 210.

The scheduler 200 schedules the transmission of individual read data transactions based on the read data transaction bandwidth and a position of the read data transaction in the read data transaction queue 204. The scheduler 200 schedules the transmission of individual write data transaction based on the write data transaction bandwidth and a position of the write data transaction in the write data transaction queue 206. The scheduler 200 schedules the transmission of individual high priority metadata requests based on the high priority metadata bandwidth and a position of the high priority metadata request in the high priority metadata request queue 208. The scheduler 200 schedules the transmission of individual low priority metadata requests based on the low priority metadata bandwidth and a position of the low priority metadata request in the low priority metadata request queue 210. The low priority metadata bandwidth is typically lower than high priority metadata bandwidth.

In an embodiment, the scheduler 200 is configured to transmit the memory access requests to the memory controller 110 as they are pulled from the associated memory access request queue. In an embodiment, the scheduler memory 202 includes a metadata transaction schedule queue 212. The scheduler 202 is configured to place the scheduled memory access requests in the metadata transaction schedule queue 212 as the memory access request is scheduled.

In an embodiment, the scheduler memory may include two of more high priority sub-level metadata queues and two or more low priority sub-level metadata queues. Each of the high priority metadata requests may be associated with a high priority sub-level and each of the low priority metadata requests may be associated with a low priority sub-level. The high priority metadata requests associated with a specific high priority sub-level is placed in the high priority sub-level metadata queues associated with the same specific high priority sub-level. Similarly, the low priority metadata requests associated with a specific low priority sub-level is placed in the low priority sub-level metadata queues associated with the same specific low priority sub-level.

In an embodiment, the scheduler memory may include a high priority read data transaction queue and a low priority read data transaction queue. Upon the receipt of a read data transaction from a core, the scheduler is configured to determine whether the read data transaction is a high priority read data transaction or low priority read data transaction. Upon a determination that the read data transaction is high priority read data transaction, the scheduler is configured to place the high priority read data transaction in the high priority read data transaction queue. Upon a determination that the read data transaction is low priority read data transaction, the scheduler is configured to place the low priority read data transaction in the low priority read data transaction queue.

In an embodiment, the scheduler memory may include a high priority write data transaction queue and a low priority write data transaction queue. Upon the receipt of a write data transaction from a core, the scheduler is configured to determine whether the write data transaction is a high priority write data transaction or low priority write data transaction. Upon a determination that the write data transaction is high priority write data transaction, the scheduler is configured to place the high priority write data transaction in the high priority write data transaction queue. Upon a determination that the write data transaction is low priority write data transaction, the scheduler is configured to place the low priority write data transaction in the low priority write data transaction queue.

Figure 3:
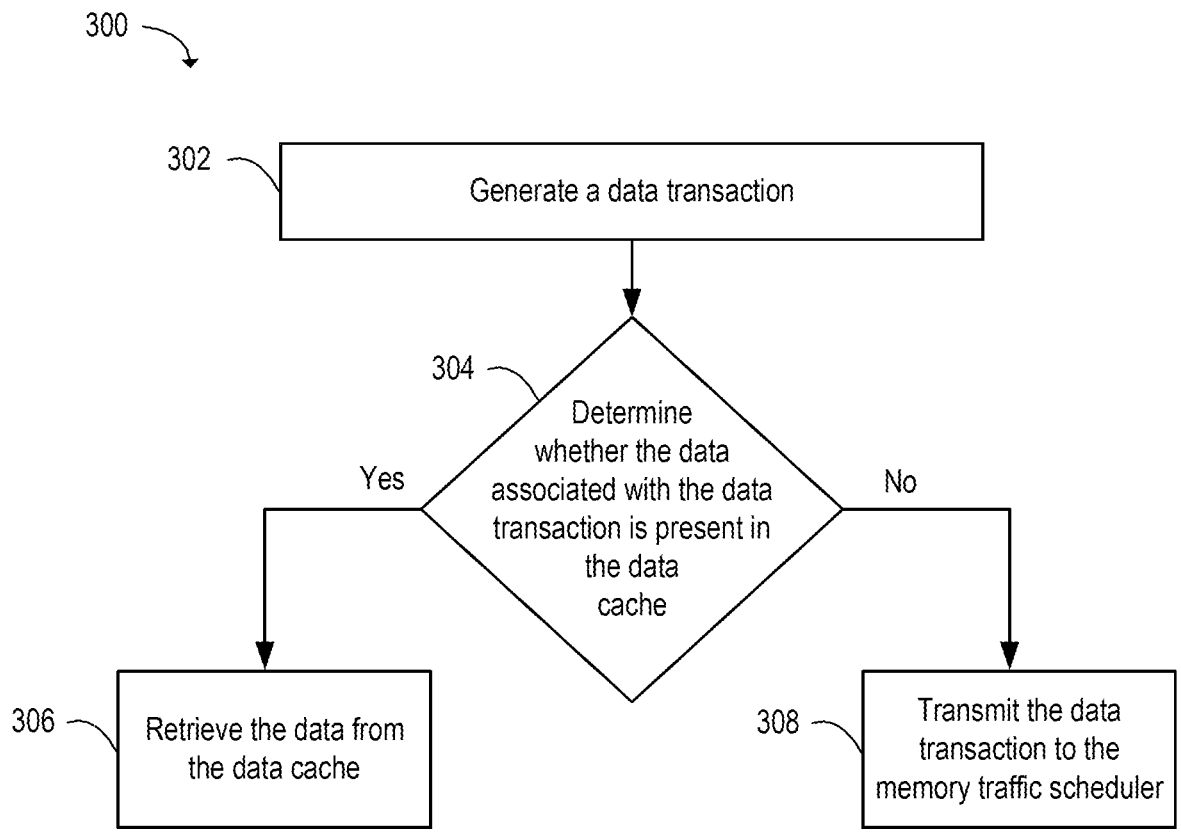
FIG. 3 is a flowchart representation of an embodiment of a method of transmitting data transactions from a core to a memory traffic scheduler.

Referring to FIG. 3, a flowchart representation of an embodiment of a method 300 of transmitting data transactions from a core 102 to a memory traffic scheduler 106 is shown. The method 300 is performed when a core 102 generates a data transaction. The method 300 may be performed by the core 102 in combination with additional components of the system 100. The method 300 may be performed by hardware circuitry, firmware, software, and/or combinations thereof.

At 302, a core 102 generates a data transaction. At 304 the core 102 determines whether the data associated with the data transaction is present in the data cache 104. If the core 102 determines that the data associated with the data transaction is present in the data cache 104, the core 102 retrieves the data from the data cache 104 at 306. If the core 102 determines that the data associated with the data transaction is not present in the data cache 104, the core 102 transmits the data transaction to the memory traffic scheduler 106 at 308. It is to be understood that the method 300 is shown at a high level in FIG. 3 and that many variations in and alternatives of the method 300 are possible.

Figure 4:
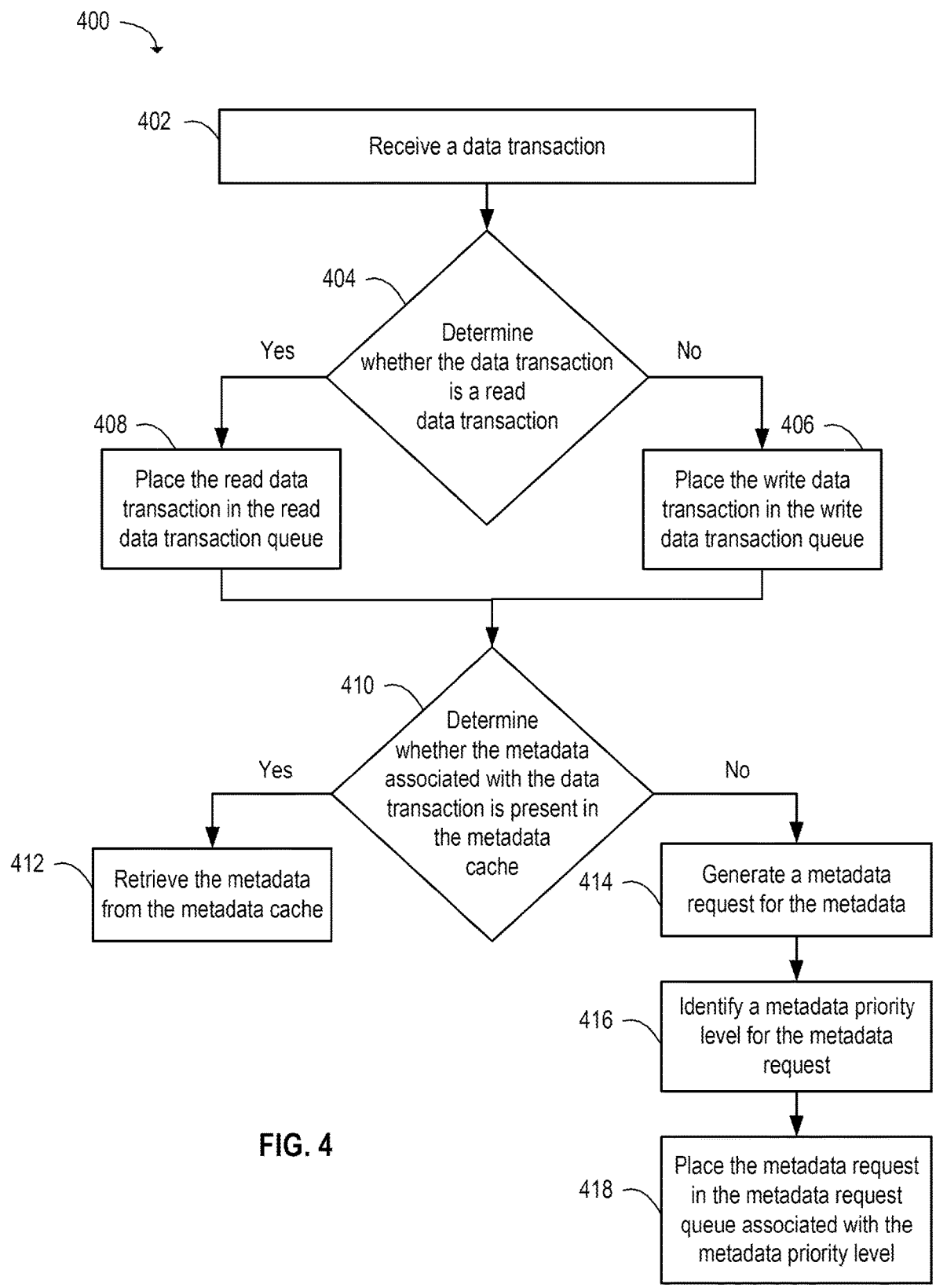
FIG. 4 is a flow chart representation of an embodiment of a method of placing memory access requests in memory access request queues.

Referring to FIG. 4, a flow chart representation of an embodiment of a method 400 of placing memory access requests in memory access request queues is shown. The method 400 is performed when the memory traffic scheduler 106 receives a data transaction from a core 102. The method 400 may be performed by the memory traffic scheduler 106 in combination with additional components of the system 100. The method 400 may be performed by hardware circuitry, firmware, software, and/or combinations thereof.

At 402, the memory traffic scheduler 106 receives a data transaction. At 404, the memory traffic scheduler 106 determines whether the data transaction is a read data transaction. If the memory traffic scheduler 106 determines that the data transaction is not a read data transaction, the memory traffic scheduler 106 determines that the data transaction is a write data transaction and places the write data transaction in the write data transaction queue at 406. If the memory traffic scheduler 106 determines that the data transaction is a read data transaction, the memory traffic scheduler 106 places the read data transaction in the read data transaction queue 204 at 408.

At 410, the memory traffic scheduler 106 determines whether metadata associated with the data transaction is present in the metadata cache 108. In an embodiment, the memory traffic scheduler 106 determines whether metadata associated with the data transaction is present in the metadata cache 108 only if the data transaction is a read data transaction. In an embodiment, the memory traffic scheduler 106 determines whether metadata associated with the data transaction is present in the metadata cache 108 only if the data transaction is a write data transaction. In an embodiment, the memory traffic scheduler 106 determines whether metadata associated with the data transaction is present in the metadata cache 108 for read data transactions and for write data transactions.

If the memory traffic scheduler 106 determines that the metadata associated with the data transaction is present in the metadata cache 108, the memory traffic scheduler 106 retrieves the metadata from the metadata cache 108 at 412. If the memory traffic scheduler 106 determines that the metadata associated with the data transaction is not present in the metadata cache 108, the memory traffic scheduler 106 generates a metadata request for the metadata at 414.

The memory traffic scheduler 106 identifies a metadata priority level for the metadata request at 416. In an embodiment, the data transaction includes a data transaction priority tag. The data transaction priority tag defines a data transaction priority level of the data transaction. In an embodiment, the data transaction priority levels include a high data transaction priority level and a low data transaction priority level. In alternative embodiments, the data transaction priority levels may include additional data transaction priority levels. The metadata priority level for the metadata request is inherited from the data transaction priority level of the associated data transaction. The memory traffic scheduler 106 identifies the metadata priority level for the metadata request as the data transaction priority level associated with the data transaction at 416.

In an embodiment, the data transaction includes a core identifier associated with the core 102 that generated the data transaction. Each core 102 is configured to generate data transactions having a specific data transaction priority level. The core identifier of a core 102 is associated with the specific data transaction priority level. In an embodiment, the data transaction priority levels include a high data transaction priority level and a low data transaction priority level. In alternative embodiments, the data transaction priority levels may include additional data transaction priority levels. The metadata priority level for the metadata request is inherited from the data transaction priority level of the associated data transaction. The memory traffic scheduler 106 identifies the data transaction priority level for the data transaction based on the core identifier in the data transaction. The memory traffic scheduler 106 identifies the metadata priority level for the metadata request as the data transaction priority level associated with the data transaction at 416.

At 418, the memory traffic scheduler 106 places the metadata request in the metadata request queue associated with the identified metadata priority level for the metadata request. If the memory traffic scheduler 106 identifies the metadata priority level for the metadata request as a high metadata priority level, the metadata request is a high priority metadata request and the memory traffic scheduler 106 places the high priority metadata request in the high priority metadata request queue 208. If the memory traffic scheduler 106 identifies the metadata priority level for the metadata request as a low metadata priority level, the metadata request is a low priority metadata request and the memory traffic scheduler 106 places the low priority metadata request in the low priority metadata request queue 210.

It is to be understood that the method 400 is shown at a high level in FIG. 4 and that many variations in and alternatives of the method 400 are possible.

Figure 5:
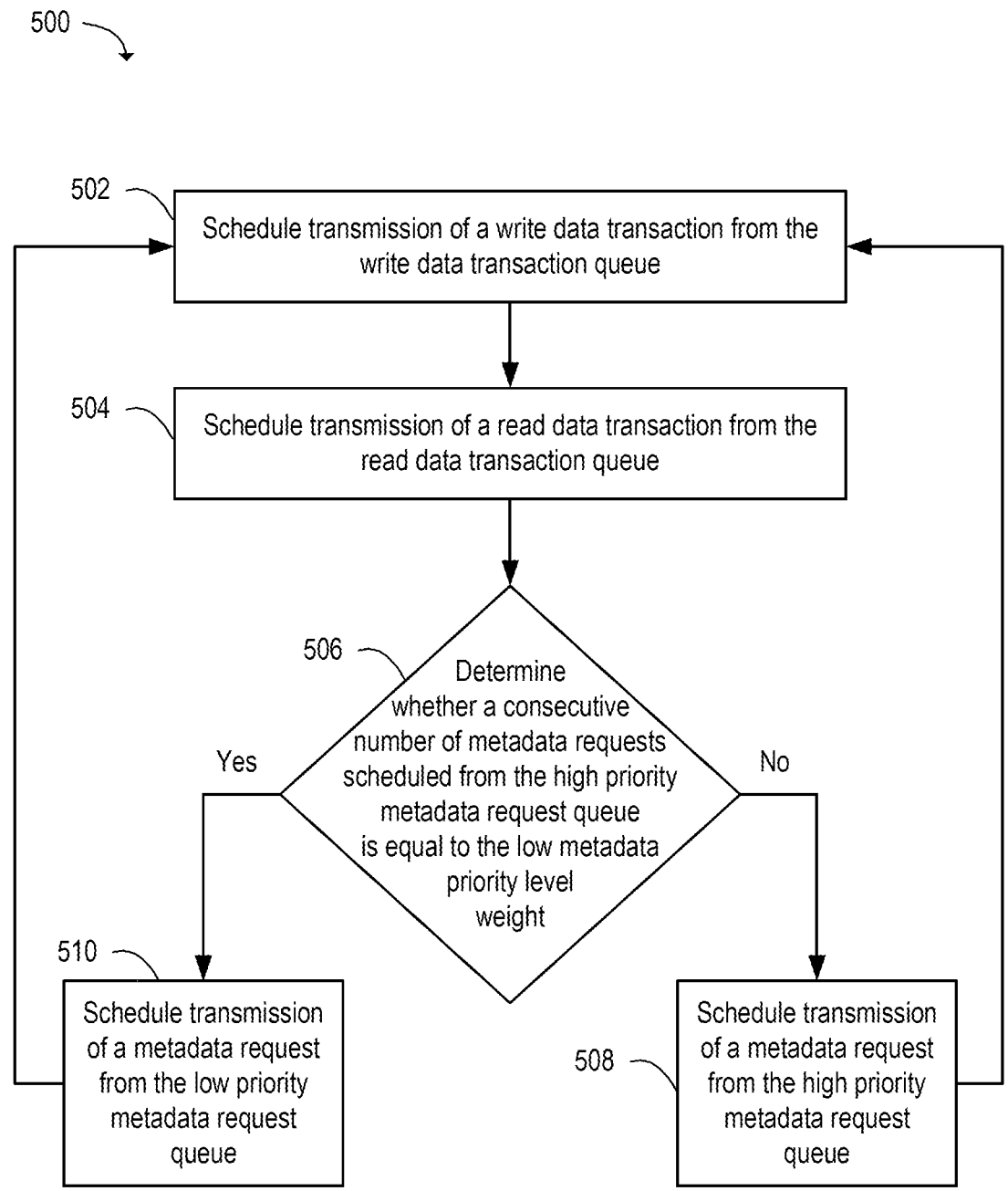
FIG. 5 is a flow chart representation of an embodiment of a method of scheduling transmission of memory access requests to a memory controller.

Referring to FIG. 5, a flow chart representation of an embodiment of a method 500 of scheduling transmission of memory access requests to a memory controller 110 is shown. The method 500 is performed by the memory traffic scheduler 106 when the memory traffic scheduler 106 schedules the transmission of the memory access requests to the memory controller 110. The memory access requests include read data transactions, write data transactions, and metadata requests. The method 500 may be performed by the memory traffic scheduler 106 in combination with additional components of the system 100. The method 500 may be performed by hardware circuitry, firmware, software, and/or combinations thereof.

At 502, the memory traffic scheduler 106 schedules transmission of a write data transaction from the write data transaction queue 206. The memory traffic scheduler 106 is configured to transmit the memory access requests to the memory controller 110 by partitioning the memory access request bandwidth. The memory access request bandwidth includes the read data transaction bandwidth, the write data transaction bandwidth, and the metadata bandwidth. The memory traffic scheduler 106 is configured to allocate the write data transaction bandwidth for transmission of write data transactions. In an embodiment, the write data transaction bandwidth is one third of the memory access request bandwidth. The memory traffic scheduler 106 schedules the transmission of the write data transaction based on the write data transaction bandwidth and the position of the write data transaction in the write data transaction queue 206. In an embodiment, the write data transaction queue 206 is a FIFO queue. The use of a FIFO queue as the write data transaction queue 206 enables the memory traffic scheduler 106 to schedule the transmission of write data transactions in the order that the write data transactions were received at the memory traffic scheduler 106.

At 504, the memory traffic scheduler 106 schedules transmission of a read data transaction from the read data transaction queue 204. The memory traffic scheduler 106 is configured to allocate the read data transaction bandwidth for transmission of read data transactions. In an embodiment, the read data transaction bandwidth is one third of the memory access request bandwidth. The memory traffic scheduler 106 schedules the transmission of the read data transaction based on the read data transaction bandwidth and the position of the read data transaction in the read data transaction queue 204. In an embodiment, the read data transaction queue 204 is a FIFO queue. The use of a FIFO queue as the read data transaction queue 204 enables the memory traffic scheduler 106 to schedule the transmission of read data transactions in the order that the read data transactions were received at the memory traffic scheduler 106.

At 506, the memory traffic scheduler 106 determines whether a consecutive number of metadata requests scheduled from the high priority metadata request queue 208 is equal to a low priority metadata weight. In an embodiment, the low priority metadata request is assigned a low priority metadata weight. In an embodiment, the low priority metadata weight is provided by a user. The low priority metadata weight defines the consecutive number of high priority metadata requests that the memory traffic scheduler 106 schedules for transmission to the memory controller 110 prior to scheduling transmission of a low priority metadata request to the memory controller 110.

If the memory traffic scheduler 106 determines that the consecutive number of metadata requests scheduled from the high priority metadata request queue 208 is not equal to the low priority metadata weight, the memory traffic scheduler 106 schedules the transmission of a high priority metadata request from the high priority metadata request queue 208 at 508. The memory traffic scheduler 106 is configured to allocate the metadata bandwidth for the transmission of metadata requests. The metadata bandwidth includes a high priority metadata bandwidth and a low priority metadata bandwidth. The low priority metadata weight defines the allocation of the portion of the metadata bandwidth as the high priority metadata bandwidth and the allocation of the portion of the metadata bandwidth as the low priority metadata bandwidth. The memory traffic scheduler 106 is configured to allocate the high priority metadata bandwidth for the transmission of high priority metadata requests. The memory traffic scheduler 106 schedules the transmission of the high priority metadata requests based on the high priority metadata bandwidth, as defined by the low priority metadata weight, and the position of the high priority metadata request in the high priority metadata request queue 208. In an embodiment, the high priority metadata request queue 208 is a FIFO queue. The use of a FIFO queue as the high priority metadata request queue 208 enables the memory traffic scheduler 106 to schedule the transmission of the high priority metadata requests in the order that the high priority metadata requests were generated at the memory traffic scheduler 106.

The method 500 then returns to 502 where the memory traffic scheduler 106 schedules the transmission of the next write data transaction from the write data transaction queue 206 thereby implementing a round robin scheme. The round robin scheme involves the scheduling of the transmission of a write data transaction followed by a read data transaction followed by a metadata request. While a particular order of scheduling the transmission of write data transactions, read data transactions and metadata requests has been described, alternative embodiments may schedule transmission of write data transactions, read data transactions and metadata requests in a different order.

If the memory traffic scheduler 106 determines that the consecutive number of metadata requests scheduled from the high priority metadata request queue 208 is equal to the low priority metadata weight, the memory traffic scheduler 106 schedules the transmission of a low priority metadata request from the low priority metadata request queue 210. As described above, the low priority metadata weight defines the allocation of the portion of the metadata bandwidth as the high priority metadata bandwidth and the allocation of the portion of the metadata bandwidth as the low priority metadata bandwidth. The memory traffic scheduler 106 is configured to allocate the low priority metadata bandwidth for the transmission of low priority metadata requests. The memory traffic scheduler 106 schedules the transmission of the low priority metadata requests based on the low priority metadata bandwidth, as defined by the low priority metadata weight, and the position of the low priority metadata request in the low priority metadata request queue 210. In an embodiment, the low priority metadata request queue 210 is a FIFO queue. The use of a FIFO queue as the low priority metadata request queue 210 enables the memory traffic scheduler 106 to schedule the transmission of the low priority metadata requests in the order that the low priority metadata requests were generated at the memory traffic scheduler 106. The method 500 then returns to 502 where the memory traffic scheduler 106 schedules the transmission of the next write data transaction in the write data transaction queue 206.

It is to be understood that the method 500 is shown at a high level in FIG. 5 and that many variations in and alternatives of the method 500 are possible.

Figure 6:
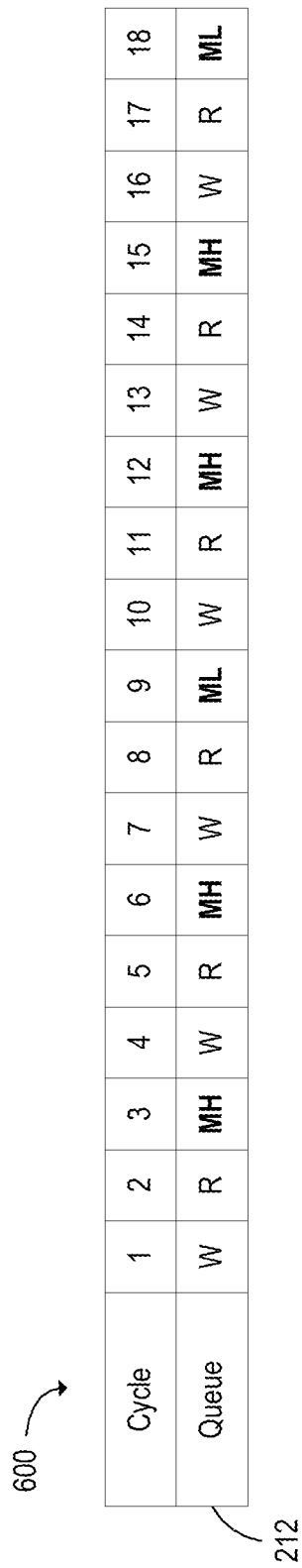
FIG. 6 is an example of an embodiment of a memory transaction schedule queue including weighted metadata requests.

Referring to FIG. 6 an example 600 of an embodiment of a memory transaction schedule queue 212 including weighted metadata requests is shown. The memory traffic scheduler 106 is configured to place the scheduled memory access requests in the metadata transaction schedule queue 212 as each individual memory access request is scheduled. The memory access requests include write data transactions W, read data transactions R, high priority metadata requests MH, and low priority metadata requests ML. Each cycle 1-18 represents a memory access request transmission cycle. The memory access request bandwidth is divided into three equal bandwidths. The three equal bandwidths are the write data transaction bandwidth, the read data transaction bandwidth, and the metadata bandwidth.

The memory traffic scheduler 106 schedules the transmission of individual write data transactions W based on the write data transaction bandwidth and the position of the write data transaction W in the write data transaction queue 206 and schedules the transmission of individual read data transactions R based on the read data transaction bandwidth and the position of the read data transaction R in the read data transaction queue 204. The memory traffic scheduler 106 schedules a write data transaction W, followed by a read data transaction R, followed by a metadata request MH/ML and repeats the sequence in accordance with the division of the memory access request bandwidth and a round robin scheme.

In the illustrated example, the low priority metadata weight has a value of two. The metadata bandwidth is divided into the high priority metadata bandwidth and the low priority metadata bandwidth in accordance with the value of the low priority metadata weight. Since the low priority metadata weight has a value of two, the memory traffic scheduler 106 schedules two consecutive high priority metadata requests MH from the high priority metadata request queue 208 followed by a low priority metadata request ML from the low priority metadata request queue 210 in accordance with the division of the metadata bandwidth and repeats the metadata request scheduling sequence.

The memory traffic scheduler 106 schedules the transmission of individual high priority metadata requests MH based on the high priority metadata bandwidth and the position of the high priority metadata request MH in the high priority metadata request queue 208 and schedules the transmission of individual low priority metadata requests ML based on the low priority metadata bandwidth and the position of the low priority metadata request ML in the low priority metadata request queue 210.

Figure 7:
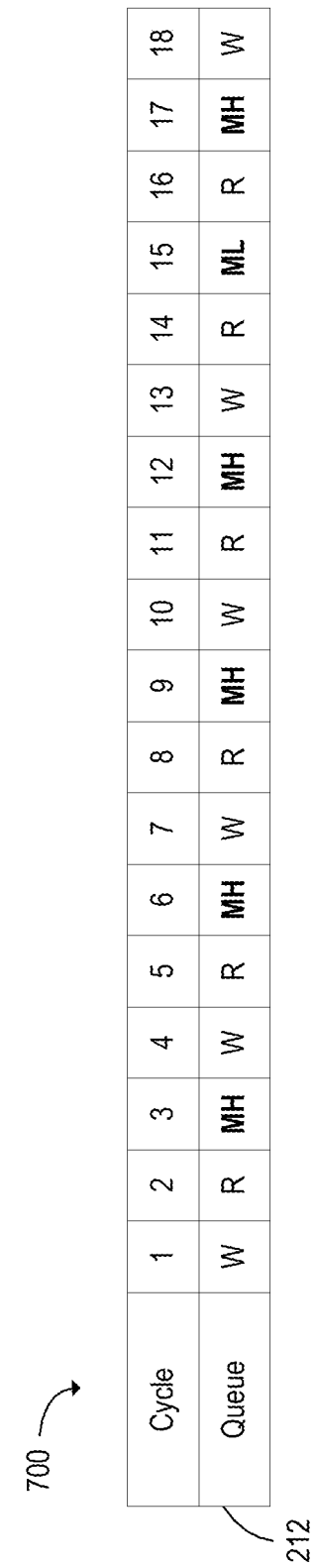
FIG. 7 is an example of an embodiment of a memory transaction schedule queue including weighted metadata requests.

Referring to FIG. 7 an example 700 of an embodiment of a memory transaction schedule queue 212 including weighted metadata requests is shown. The memory traffic scheduler 106 is configured to place the scheduled memory access requests in the metadata transaction schedule queue 212 as each individual memory access request is scheduled. The memory access requests include write data transactions W, read data transactions R, high priority metadata requests MH, and low priority metadata requests ML. Each cycle 1-18 represents a memory access request transmission cycle. The memory access request bandwidth is divided into three equal bandwidths. The three equal bandwidths are the write data transaction bandwidth, the read data transaction bandwidth, and the metadata bandwidth.

The memory traffic scheduler 106 schedules the transmission of individual write data transactions W based on the write data transaction bandwidth and the position of the write data transaction W in the write data transaction queue 206 and schedules the transmission of individual read data transactions R based on the read data transaction bandwidth and the position of the read data transaction R in the read data transaction queue 204. The memory traffic scheduler 106 schedules a write data transaction W, followed by a read data transaction R, followed by a metadata request MH/ML and repeats the sequence in accordance with the division of the memory access request bandwidth and a round robin scheme.

In the illustrated example, the low priority metadata weight has a value of four. The metadata bandwidth is divided into the high priority metadata bandwidth and the low priority metadata bandwidth in accordance with the value of the low priority metadata weight. Since the low priority metadata weight has a value of four, the memory traffic scheduler 106 schedules four consecutive high priority metadata requests MH from the high priority metadata request queue 208 followed by a low priority metadata request ML from the low priority metadata request queue 210 in accordance with the division of the metadata bandwidth and repeats the metadata request scheduling sequence.

The memory traffic scheduler 106 schedules the transmission of individual high priority metadata requests MH based on the high priority metadata bandwidth and the position of the high priority metadata request MH in the high priority metadata request queue 208 and schedules the transmission of individual low priority metadata requests ML based on the low priority metadata bandwidth and the position of the low priority metadata request ML in the low priority metadata request queue 210.

In an alternative embodiment, the metadata bandwidth is associated with a metadata request transmission cycle period. The metadata traffic scheduler 106 is allocates a first portion of the metadata request transmission cycle period for transmission of low priority metadata requests and a second portion of the metadata request transmission cycle period for transmission of high priority metadata requests. Scheduling requests from the low priority metadata request queue for a fixed duration at regular intervals may prevent starvation of low-priority workloads.

Figure 8:
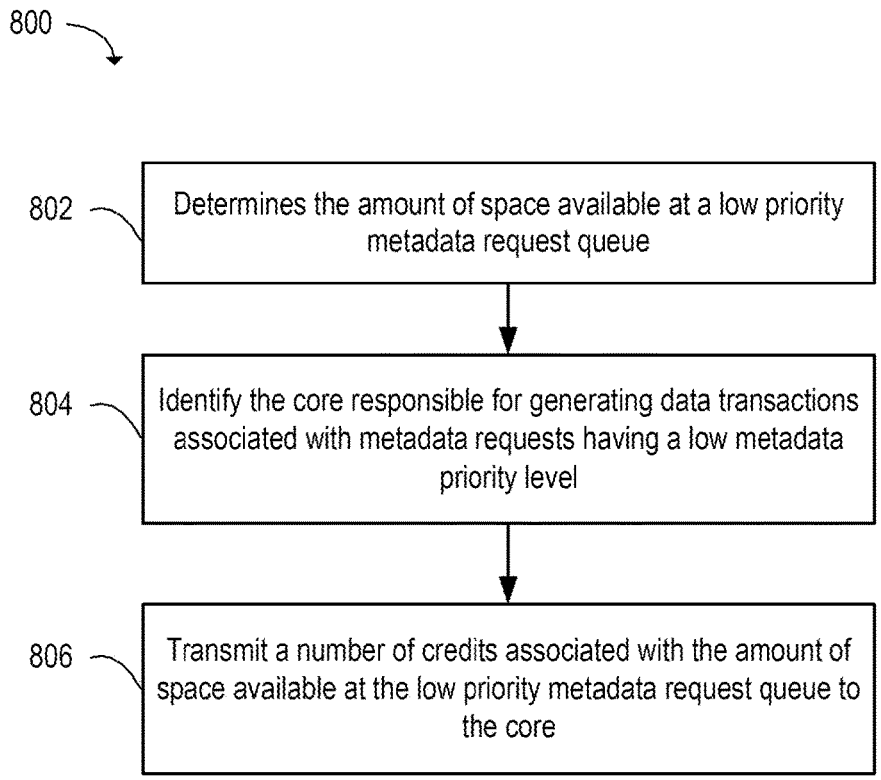
FIG. 8 is a flowchart representation of an embodiment of a method of managing transmission of data transactions from a core to a memory traffic scheduler.

Referring to FIG. 8, a flowchart representation of an embodiment of a method 800 of managing transmission of data transactions from a core 102 to a memory traffic scheduler 106 is shown. The method 800 is performed by the memory traffic scheduler 106 to manage transmission of data transactions from a core 102 to the memory traffic scheduler 106 using a credit based feedback system. The method 800 may be performed by the memory traffic scheduler 106 in combination with additional components of the system 100. The method 800 may be performed by hardware circuitry, firmware, software, and/or combinations thereof.

In an embodiment, one of the plurality of cores 102 is responsible for generating data transactions associated with low priority metadata requests. At 802, the memory traffic scheduler 106 determines the amount of space available at the low priority metadata request data queue 210. The memory traffic scheduler 106 identifies the one of the plurality of cores 102 responsible for generating data transactions associated with the metadata requests having a low metadata priority level at 804. The memory traffic scheduler 106 transmits a number of credits associated with the amount of space available at the low priority metadata request queue 210 to the identified core 102 at 806. The core 102 uses the number of credits received from the memory traffic scheduler 106 to determine the number of the data transactions that the core 102 is permitted to transmit to the memory traffic scheduler 106. The memory traffic scheduler 106 performs the method 800 on a periodic basis to provide the core 102 with an updated number of credits on a periodic basis. It is to be understood that the method 800 is shown at a high level in FIG. 8 and that many variations in and alternatives of the method 800 are possible.

Figure 9:
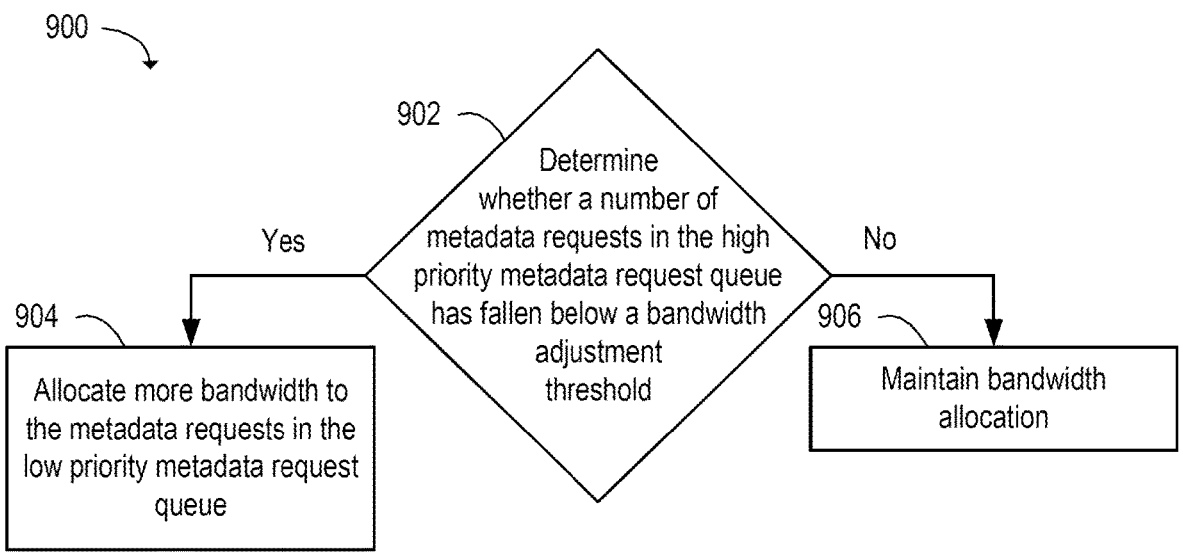
FIG. 9 is a flowchart representation of an embodiment of a method of dynamically adjusting allocation of a metadata bandwidth for transmission of high priority metadata requests and low priority metadata requests.

Referring to FIG. 9, a flowchart representation of an embodiment of a method 900 of dynamically adjusting allocation of a metadata bandwidth for the transmission of high priority metadata requests and the transmission of low priority metadata requests is shown. The method 900 is performed by the memory traffic scheduler 106 to dynamically adjust the division of the metadata bandwidth into the high priority metadata bandwidth and the low priority metadata bandwidth. The method 900 may be performed by the memory traffic scheduler 106 in combination with additional components of the system 100. The method 900 may be performed by hardware circuitry, firmware, software, and/or combinations thereof.

At 902, the memory traffic scheduler 106 determines whether the number of high priority metadata requests in the high priority metadata request queue 208 has fallen below a bandwidth adjustment threshold. When the number of high priority metadata requests in the high priority metadata request queue 208 falls below the bandwidth adjustment threshold, the memory traffic scheduler 106 may not be able to efficiently utilize the metadata bandwidth for the transmission of metadata requests.

If the memory traffic scheduler 106 determines that the number of high priority metadata requests in the high priority metadata request queue 208 has fallen below the bandwidth adjustment threshold, the memory traffic scheduler 106 increases the portion of the metadata bandwidth designated as the low priority metadata bandwidth while reducing the portion of the metadata bandwidth designated as the high priority metadata bandwidth at 904. This may enable the memory traffic scheduler 106 to efficiently utilize the metadata bandwidth for the transmission of metadata requests to the memory controller 110.

If the memory traffic scheduler 106 determines that the number of high priority metadata requests in the high priority metadata request queue 208 has not fallen below the bandwidth adjustment threshold, the memory traffic scheduler 106 maintains the current division of the metadata bandwidth into the high priority metadata bandwidth and the low priority metadata bandwidth at 906. The memory traffic scheduler 106 performs the method 900 on a periodic basis to dynamically adjust the allocation of the metadata bandwidth to the high priority metadata bandwidth and the low priority metadata bandwidth. It is to be understood that the method 900 is shown at a high level in FIG. 9 and that many variations in and alternatives of the method 900 are possible.

Figure 10:
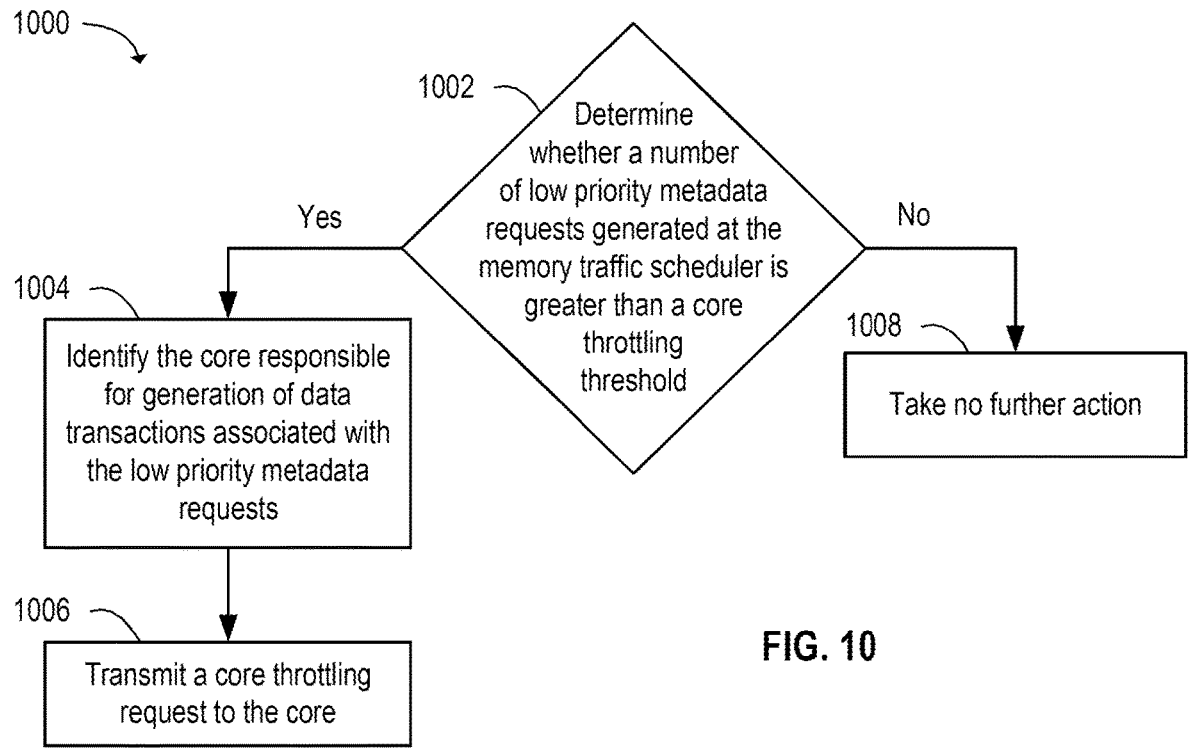
FIG. 10 is a flowchart representation of an embodiment of a method of managing transmission of data transactions from a core to a memory traffic scheduler.

Referring to FIG. 10, a flowchart representation of an embodiment of a method 1000 of managing transmission of data transactions from a core 102 to the memory traffic scheduler 106 is shown. The method 1000 is performed by the memory traffic scheduler 106 to manage transmission of data transactions from a core 102 to the memory traffic scheduler 106. The method 1000 may be performed by the memory traffic scheduler 106 in combination with additional components of the system 100. The method 1000 may be performed by hardware circuitry, firmware, software, and/or combinations thereof.

In an embodiment, one of the plurality of cores 102 is responsible for generating data transactions associated with low priority metadata requests. At 1002, the memory traffic scheduler 106 determines whether the number of low priority metadata requests generated at the memory traffic scheduler 106 is greater than a core throttling threshold. If the memory traffic scheduler 106 determines that the number of low priority metadata requests generated at the memory traffic scheduler 106 is greater than the core throttling threshold, the memory traffic scheduler 106 identifies the one of the plurality of cores 102 responsible for generating data transactions associated with the metadata requests having the low metadata priority level at 1004.

The memory traffic scheduler 106 transmits a core throttling request to the identified core 102 at 1006. Upon the receipt of the core throttling request, the core 102 throttles back on the number of data transactions that the core 102 transmits to the memory traffic scheduler 106 thereby decreasing the number of low priority metadata requests generated at the memory traffic scheduler 106.

If the memory traffic scheduler 106 determines that the number of low priority metadata requests generated at the memory traffic scheduler 106 is not greater than the core throttling threshold, no further action is taken at 1008. The memory traffic scheduler 106 performs the method 1000 on a periodic basis. It is to be understood that the method 1000 is shown at a high level in FIG. 10 and that many variations in and alternatives of the method 1000 are possible.

Figure 11:
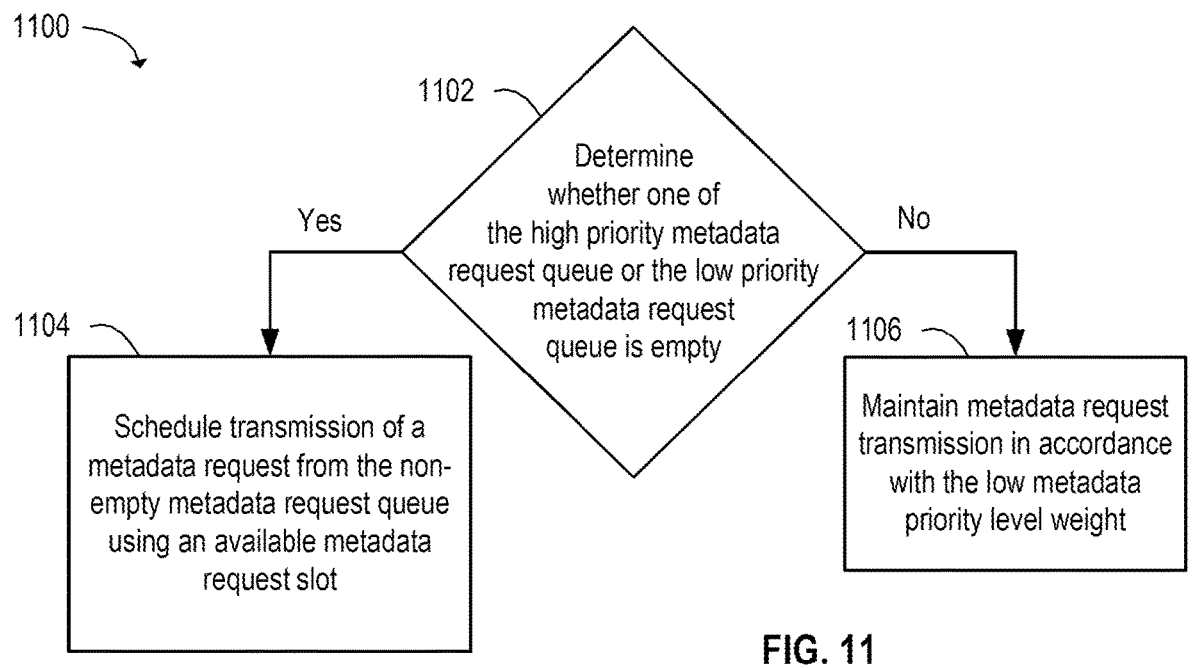
FIG. 11 is a flowchart representation of an embodiment of a method of scheduling metadata requests to a memory controller.

Referring to FIG. 11, a flowchart representation of an embodiment of a method 1100 of scheduling metadata requests to a memory controller 110 is shown. The method 1100 is performed by the memory traffic scheduler 106 to manage transmission of metadata requests from the memory traffic scheduler 106 to the memory controller 110. The method 1100 may be performed by the memory traffic scheduler 106 in combination with additional components of the system 100. The method 1100 may be performed by hardware circuitry, firmware, software, and/or combinations thereof.

As described above, the metadata bandwidth is divided into the high priority metadata bandwidth and the low priority metadata bandwidth in accordance with the value of the low priority metadata weight. For example, if the low priority metadata weight has a value of X, the memory traffic scheduler 106 schedules X consecutive high priority metadata requests from the high priority metadata request queue 208 followed by a low priority metadata request from the low priority metadata request queue 210 and repeats the metadata request scheduling sequence. If the high priority metadata request queue 208 is empty, the memory traffic scheduler 106 may be unable to schedule a high priority metadata request in one of the X consecutive high priority metadata requests slots and the high priority metadata request slot will be unused. Similarly, if the low priority metadata request queue 210 is empty, the memory traffic scheduler 106 may be unable to schedule a low priority metadata request in one of the low priority metadata request slots following the X consecutive high priority metadata requests slots and the low priority metadata request slot will be unused. The method 1100 seeks to fill the empty metadata request slots when either the high priority metadata queue 208 request queue is empty or the low priority metadata queue 210 request queue is empty.

At 1102, the memory traffic scheduler 106 determines whether one of the high priority metadata request queue 208 or the low priority metadata request queue 210 is empty. If the memory traffic scheduler 106 determines that one of the high priority metadata request queue 208 or the low priority metadata request queue 210 is empty, the memory traffic scheduler 106 schedules transmission of a metadata request from the other one of the high priority metadata request queue 208 or the low priority metadata request queue 210 using an available metadata request slot at 1104. If the memory traffic scheduler 106 determines that one of the high priority metadata request queue 208 or the low priority metadata request queue 210 is not empty, the memory traffic scheduler 106 maintains transmission of the metadata requests in accordance with the low metadata priority weight at 1106. It is to be understood that the method 1100 is shown at a high level in FIG. 11 and that many variations in and alternatives of the method 1100 are possible.

The implementation of a Quality of Service (QoS) scheme to manage the transmission of high priority metadata requests and low priority metadata requests based on the allocation of a high priority metadata bandwidth for the transmission of high priority metadata requests and a low priority metadata bandwidth for the transmission of low priority metadata requests may ensure that a misbehaving workload on a given core/thread does not adversely affect performance of the other workloads that are co-resident on a platform. The QoS scheme may rely on limiting the rate of allocation into the metadata cache by limiting the memory bandwidth available for metadata lookups based on the class of service associated with a metadata request. The QoS associated with a metadata request corresponds to the metadata priority level associated with the metadata request.

In order to implement QoS for the metadata cache, the system 100 may rely on handling memory traffic corresponding to metadata requests based on a weighted metadata priority scheduling scheme. The metadata requests inherit the QoS service parameters of their parent data transactions and are scheduled based on their priority instead of just a first-in-first-out manner. This indirectly controls the rate at which low-priority threads can allocate entries into, i.e., pollute the metadata cache and thereby, contribute to improved performance for higher-priority threads.

The metadata traffic scheduler 106 maintains separate metadata request queues based on the QoS of the parent read/write data transactions. This may ensure that metadata requests from high-priority workloads are prioritized over those from low-priority workloads.

In an alternative embodiment, a leaky-bucket implementation may be used to accurately partition available bandwidth among the metadata queues (or even all the queues) by accounting for traffic bursts and their priority. In another embodiment, the memory traffic scheduler 106 may allocate a fixed fraction of the available metadata bandwidth to each class of service. In alternative embodiments, the memory traffic scheduler 106 may also maintain separate queues per QoS class for read data transactions and write data transactions.

Figure 12A:
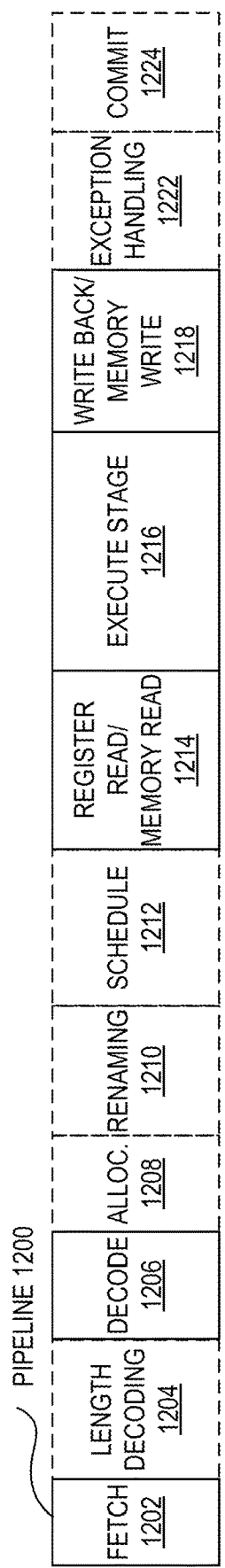
FIGS. 12A and 12B illustrate a block diagram of a more specific exemplary in-order core architecture.
Figure 12B:
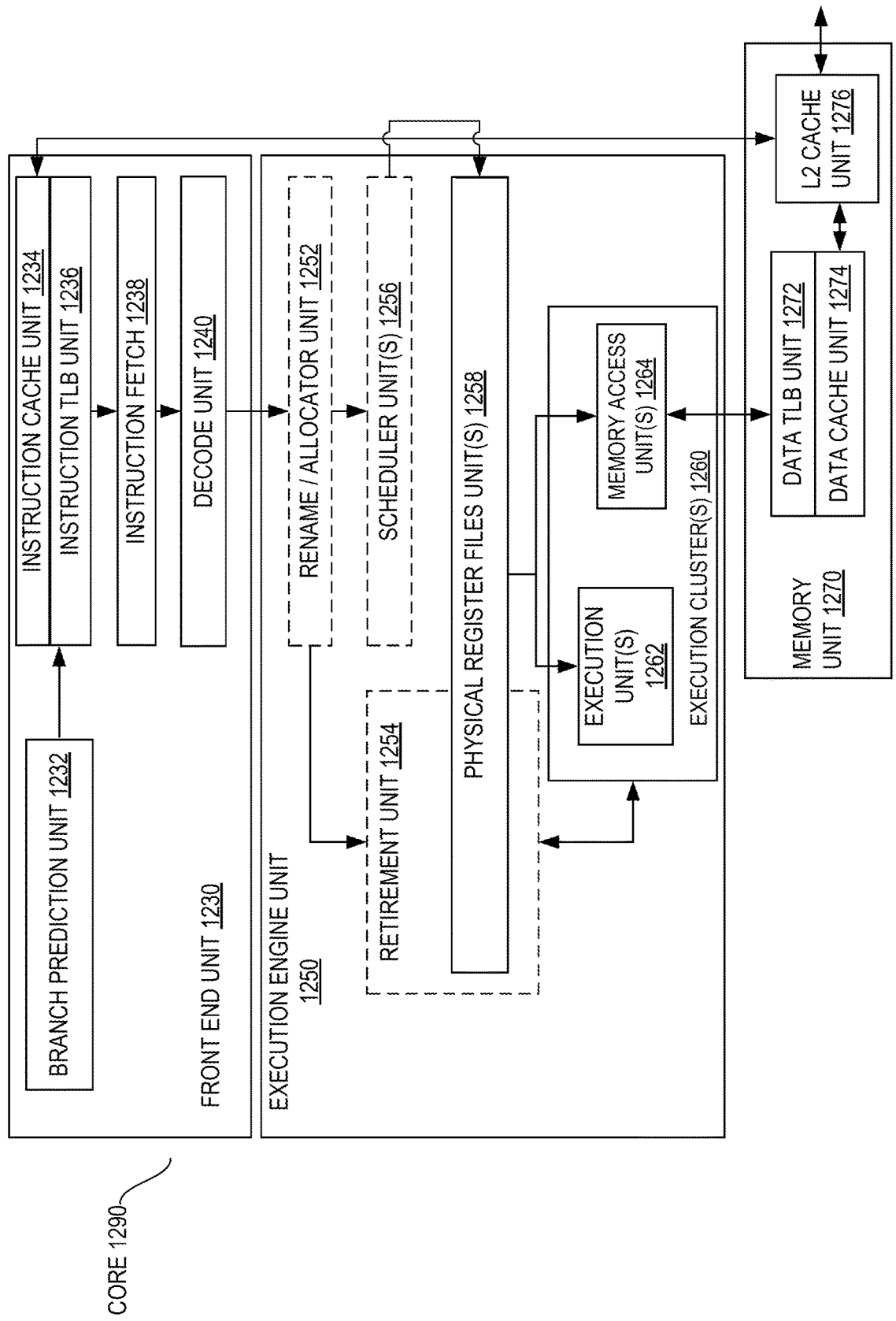

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A and 12B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224. Note that as described herein, in a given embodiment a core may include multiple processing pipelines such as pipeline 1200.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13:
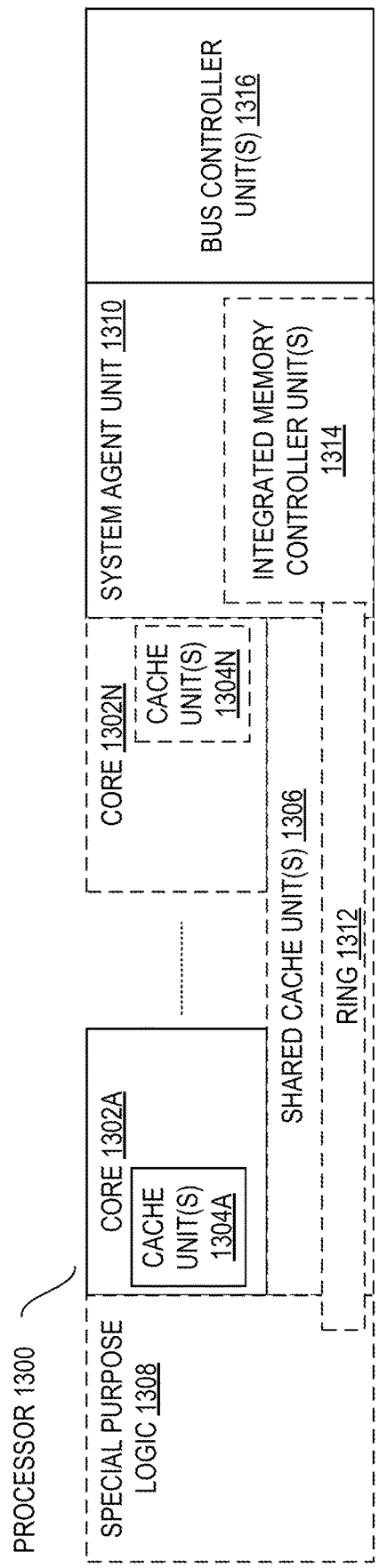
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) in the system agent unit 910, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache units 1304A-N within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the special purpose logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302A-N.

The system agent unit 1310 includes those components coordinating and operating cores 1302A-N. The system agent unit 1310 may include for example a power control unit (PCU) and a display unit. The PCU may be or include logic and components needed for regulating the power state of the cores 1302A-N and the special purpose logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Figure 14:
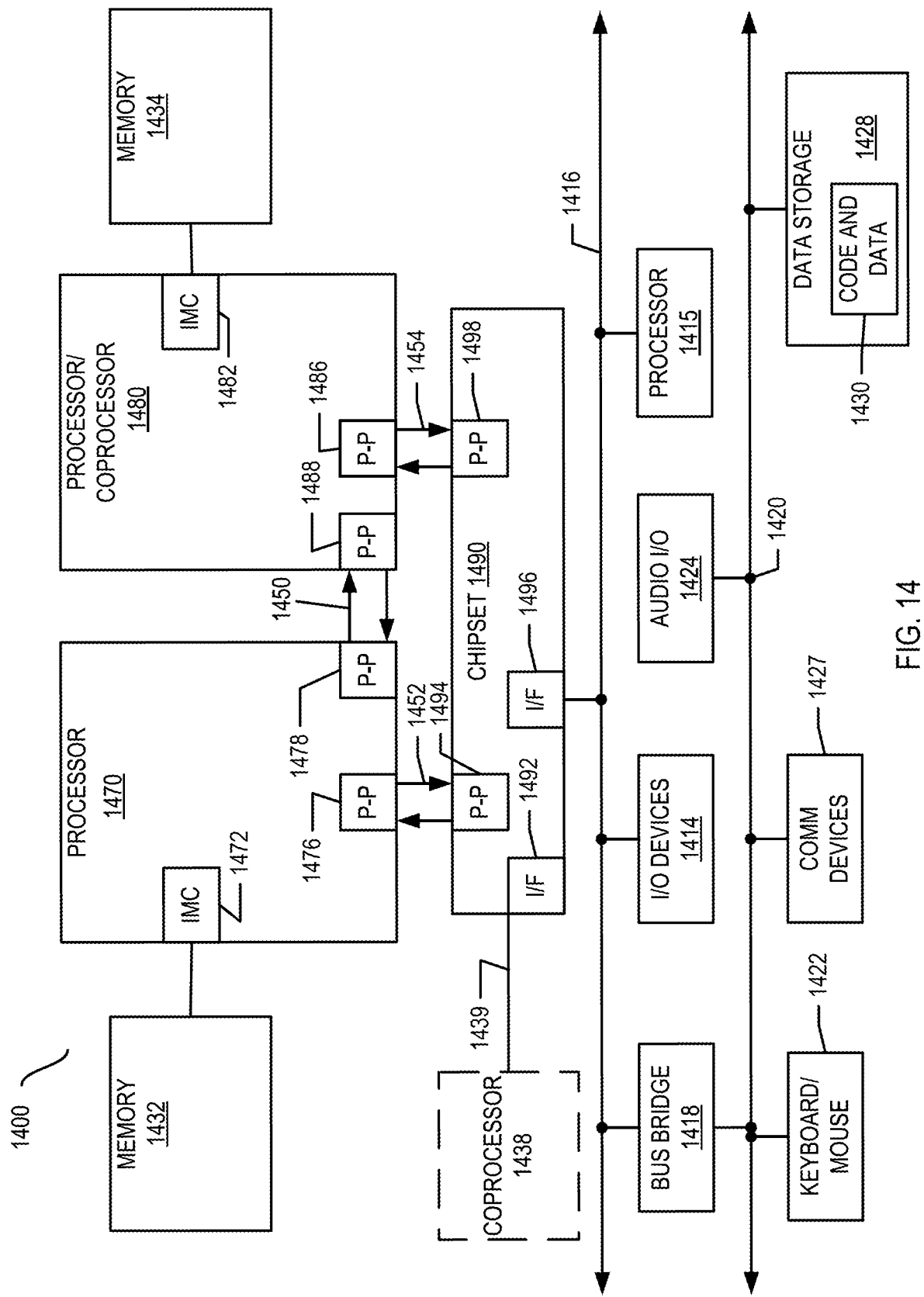
FIG. 14 is a block diagram of a first more specific exemplary system in accordance with an embodiment.
Figure 15:
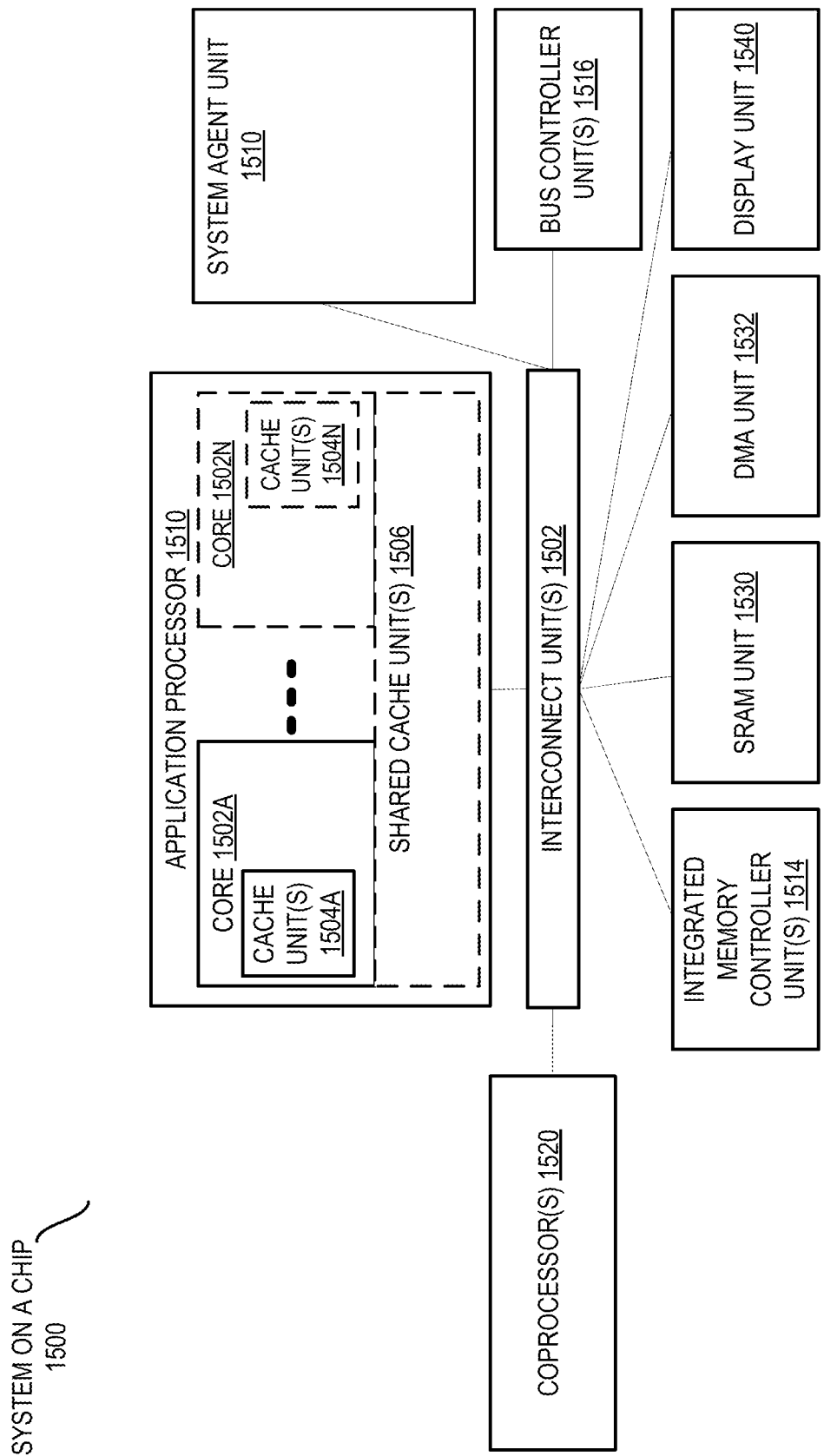
FIG. 15 is a block diagram of a SoC in accordance with an embodiment.

FIGS. 14-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1400.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Referring now to FIG. 15, shown is a block diagram of a SoC 1500 in accordance with an embodiment of the present invention. Dashed lined boxes are optional features on more advanced SoCs. In FIG. 15, an interconnect unit(s) 1502 is coupled to: an application processor 1510 which includes a set of one or more cores 1502A-N (including constituent cache units 1504A-N) and shared cache unit(s) 1506; a system agent unit 1510; a bus controller unit(s) 1516; an integrated memory controller unit(s) 1514; a set or one or more coprocessors 1520 which may include integrated graphics logic, an image processor, an audio processor, and a video processor; a static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x186 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

The following examples pertain to further embodiments.

In one example, an apparatus includes: a memory to store a plurality of metadata requests, each of the plurality of metadata requests associated with one of a plurality of metadata priority levels; and a scheduler coupled to the memory and to a memory controller, the scheduler to schedule transmission of a first metadata request of the plurality of metadata requests to the memory controller based at least in part on a first metadata priority level associated with the first metadata request and a first bandwidth portion of a metadata request bandwidth, the first bandwidth portion associated with the first metadata priority level.

In an example, the scheduler is to receive a first data transaction associated with a first data transaction priority level for transmission to the memory controller; determine whether metadata associated with the first data transaction is available at a metadata cache; and generate the first metadata request associated with the metadata to have a first metadata priority level inherited from the first data transaction priority level based upon the determination.

In an example, the scheduler is to receive a first data transaction comprising a data transaction priority tag associated with a first data transaction priority level; and generate the first metadata priority level for association with the first metadata request for metadata associated with the first data transaction, the first metadata priority level to be inherited from the first data transaction priority level.

In an example, the scheduler is to receive a first data transaction from a first core of a plurality cores, the first core associated with a first core priority level; and generate the first metadata priority level for association with the first metadata request for metadata associated with the first data transaction, the first metadata priority level to be inherited from the first core priority level.

In an example, the memory further comprises a plurality of metadata request queues, each of the plurality of metadata request queues associated with one of the plurality of metadata priority levels, and the scheduler is to generate the first metadata request associated with the first metadata priority level; place the first metadata request in a first metadata request queue associated with the first metadata priority level; and schedule transmission of the first metadata request to the memory controller based at least in part on a position of the first metadata request in the first metadata request queue.

In an example, the scheduler is to identify a first core of a plurality of cores responsible for generation of data transactions associated with metadata requests having the first metadata priority level; generate bandwidth availability data associated with the first bandwidth portion of the metadata bandwidth; and transmit the bandwidth availability data to the first core to enable the first core to manage a number of data transactions transmitted to the apparatus based on the bandwidth availability data.

In an example, the scheduler is to compare a number of metadata requests of the plurality of metadata requests associated with the first metadata priority level to a bandwidth adjustment threshold; and dynamically adjust the first bandwidth portion of the metadata bandwidth based on the comparison.

In an example, the scheduler is to determine whether a number of metadata requests of the plurality of metadata requests associated with the first metadata priority level exceeds a core throttling threshold, the first metadata priority level being a low priority level; and identify a first core of a plurality of cores responsible for generation of data transactions associated with metadata requests having the first metadata priority level and transmit a data transaction throttling request to the first core based on the determination.

In an example, each of the plurality of metadata priority levels is associated with a metadata priority level weight, and the scheduler is to allocate the first bandwidth portion of the metadata bandwidth to metadata requests associated with the first metadata priority level based at least in part on a first metadata priority level weight associated with the first metadata priority level.

In an example, the memory includes at least two metadata request queues, each of the at least two metadata request queues associated with one of the plurality of metadata priority levels, and the scheduler is further to generate the first metadata request associated with the first metadata priority level; place the first metadata request in a first metadata request queue associated with the first metadata priority level; and schedule transmission of the first metadata request to the memory controller based at least in part on a position of the first metadata request in the first metadata request queue.

In an example, the scheduler is to determine whether the plurality of metadata requests includes another metadata request associated with the first metadata priority level; and schedule transmission of a second metadata request of the plurality of metadata requests to the memory controller using the first bandwidth portion bandwidth of the metadata bandwidth based on the determination, the second metadata request having a second metadata priority level of the plurality of metadata priority levels.

In an example, the scheduler is to schedule transmission of a second metadata request of the plurality of metadata requests to the memory controller based at least in part on a second metadata priority level associated with the second metadata request and a second bandwidth portion of the metadata request bandwidth, the second bandwidth portion allocated for transmission of metadata requests associated with the second metadata priority level, the first bandwidth portion of the metadata bandwidth being less than the second bandwidth portion of the metadata bandwidth based at least in part on the first metadata priority level being lower than the second metadata priority level.

In one example, a machine-readable medium includes instructions stored thereon, which if performed by a machine, cause the machine to: receive a plurality of data transactions at a memory traffic scheduler, each of the plurality of data transactions associated with a transaction receipt time and a data transaction priority level; generate a plurality of metadata requests at the memory traffic scheduler, each of the plurality of metadata requests associated with one of the plurality of data transactions and a metadata priority level of a plurality of metadata priority levels inherited from the data transaction priority level of the one of the plurality of data transactions; and schedule transmission of a first metadata request of the plurality of metadata requests to the memory controller based at least in part on a first metadata priority level associated with the first metadata request and a first bandwidth portion of a metadata request bandwidth, the first bandwidth portion associated with the first metadata priority level.

In an example, the machine-readable medium includes instructions to cause the machine to schedule transmission of a second metadata request of the plurality of metadata requests associated with a second data transaction to the memory controller based at least in part on a second metadata priority level associated with the second metadata request, a second time receipt associated with the second data transaction, and a second bandwidth portion of the metadata request bandwidth allocated for transmission of metadata requests associated with the second metadata priority level, the first bandwidth portion of the metadata bandwidth being less than the second bandwidth portion of the metadata bandwidth based at least in part on the first metadata priority level being lower than the second metadata priority level.

In an example, the machine-readable medium includes instructions to cause the machine to associate each of the plurality of metadata priority levels with a metadata priority level weight; and allocate the first bandwidth portion of the metadata bandwidth to metadata requests associated with the first metadata priority level based at least in part on a first metadata priority level weight associated with the first metadata priority level.

In one example, a system includes a plurality of cores; a memory controller; a metadata cache; and a memory traffic scheduler coupled to the plurality of cores, the memory controller, and the metadata cache. The memory traffic scheduler to store a plurality of metadata requests, each of the plurality of metadata requests associated with one of a plurality of metadata priority levels; and schedule transmission of a first metadata request of the plurality of metadata requests to the memory controller based at least in part on a first metadata priority level associated with the first metadata request and a first bandwidth portion of a metadata request bandwidth, the first bandwidth portion associated with the first metadata priority level.

In an example, the memory traffic scheduler is to store a plurality of read data transactions, each of the plurality of read data transactions associated with one of a plurality of read data transaction priority levels; and schedule transmission of a first read data transaction of the plurality of read data transactions to the memory controller based at least in part on a first read data transaction priority level associated with the first read data transaction and a first bandwidth portion of a read data transaction bandwidth allocated for transmission of read data transactions to the memory controller, the first bandwidth portion of the read data transaction bandwidth allocated for transmission of read data transactions associated with the first read data transaction priority level.

In an example, the memory traffic scheduler is to store a plurality of write data transactions, each of the plurality of write data transactions associated with one of a plurality of write data transaction priority levels; and schedule transmission of a write data transaction of the plurality of write data transactions to the memory controller based at least in part on a first write data transaction priority level associated with the first write data transaction and a first bandwidth portion of a write data transaction bandwidth allocated for transmission of write data transactions to the memory controller, the first bandwidth portion of the write data transaction bandwidth allocated for transmission of write data transactions associated with the first write data transaction priority level.

In an example, the memory traffic scheduler includes at least two metadata request queues, each of the at least two metadata request queues associated with one of the plurality of metadata priority levels, and the memory traffic scheduler is to generate the first metadata request associated with the first metadata priority level; place the first metadata request in a first metadata request queue associated with the first metadata priority level; and schedule transmission of the first metadata request to the memory controller based at least in part on a position of the first metadata request in the first metadata request queue.

In an example, the memory traffic scheduler comprises a read data transaction queue and a write data transaction queue, and the memory traffic scheduler is further to schedule transmission of a first read data transaction from the read data transaction queue to the memory controller based at least in part on a position of the first read data transaction in the read data transaction queue and a read data transaction bandwidth; and schedule transmission of a first write data transaction from the write data transaction queue to the memory controller based at least in part on a position of the first write data transaction in the write data transaction queue and a write data transaction bandwidth.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a memory to store a plurality of metadata requests, each of the plurality of metadata requests associated with one of a plurality of metadata priority levels; and
a scheduler coupled to the memory and to a memory controller, the scheduler to schedule transmission of a first metadata request of the plurality of metadata requests to the memory controller based at least in part on a first metadata priority level associated with the first metadata request and a first bandwidth portion of a metadata request bandwidth, the first bandwidth portion associated with the first metadata priority level, wherein each of the plurality of metadata priority levels is associated with a metadata priority level weight, and the scheduler is further to allocate the first bandwidth portion of the metadata bandwidth to metadata requests associated with the first metadata priority level based at least in part on a first metadata priority level weight associated with the first metadata priority level.

2. The apparatus of claim 1, wherein the scheduler is further to:
receive a first data transaction associated with a first data transaction priority level for transmission to the memory controller;
determine whether metadata associated with the first data transaction is available at a metadata cache; and
generate the first metadata request associated with the metadata to have a first metadata priority level inherited from the first data transaction priority level based upon the determination.

3. The apparatus of claim 1, wherein the scheduler is further to:
receive a first data transaction comprising a data transaction priority tag associated with a first data transaction priority level; and
generate the first metadata priority level for association with the first metadata request for metadata associated with the first data transaction, the first metadata priority level to be inherited from the first data transaction priority level.

4. The apparatus of claim 1, wherein the scheduler is further to:
receive a first data transaction from a first core of a plurality of cores, the first core associated with a first core priority level; and
generate the first metadata priority level for association with the first metadata request for metadata associated with the first data transaction, the first metadata priority level to be inherited from the first core priority level.

5. The apparatus of claim 1, wherein the memory further comprises a plurality of metadata request queues, each of the plurality of metadata request queues associated with one of the plurality of metadata priority levels, and the scheduler is further to:
generate the first metadata request associated with the first metadata priority level;
place the first metadata request in a first metadata request queue associated with the first metadata priority level; and
schedule transmission of the first metadata request to the memory controller based at least in part on a position of the first metadata request in the first metadata request queue.

6. The apparatus of claim 1, wherein the scheduler is further to:
identify a first core of a plurality of cores responsible for generation of data transactions associated with metadata requests having the first metadata priority level;
generate bandwidth availability data associated with the first bandwidth portion of the metadata bandwidth; and
transmit the bandwidth availability data to the first core to enable the first core to manage a number of data transactions based on the bandwidth availability data.

7. The apparatus of claim 1, wherein the scheduler is further to:
compare a number of metadata requests of the plurality of metadata requests associated with the first metadata priority level to a bandwidth adjustment threshold; and
dynamically adjust the first bandwidth portion of the metadata bandwidth based on the comparison.

8. The apparatus of claim 1, wherein the scheduler is further to:
determine whether a number of metadata requests of the plurality of metadata requests associated with the first metadata priority level exceeds a core throttling threshold; and
identify a first core of a plurality of cores responsible for generation of data transactions associated with metadata requests having the first metadata priority level and transmit a data transaction throttling request to the first core based on the determination.

9. The apparatus of claim 1, wherein the memory comprises at least two metadata request queues, each of the at least two metadata request queues associated with one of the plurality of metadata priority levels, and the scheduler is further to:
generate the first metadata request associated with the first metadata priority level;

place the first metadata request in a first metadata request queue associated with the first metadata priority level; and schedule transmission of the first metadata request to the memory controller based at least in part on a position of the first metadata request in the first metadata request queue.

10. The apparatus of claim 1, wherein the scheduler is further to:
   determine whether the plurality of metadata requests includes another metadata request associated with the first metadata priority level; and
   schedule transmission of a second metadata request of the plurality of metadata requests to the memory controller using the first bandwidth portion bandwidth of the metadata bandwidth based on the determination.

11. The apparatus of claim 1, wherein the scheduler is further to:
   schedule transmission of a second metadata request of the plurality of metadata requests to the memory controller based at least in part on a second metadata priority level associated with the second metadata request and a second bandwidth portion of the metadata request bandwidth, the second bandwidth portion allocated for transmission of metadata requests associated with the second metadata priority level.

12. A machine-readable medium comprising instructions stored thereon, which if performed by a machine, cause the machine to:
   receive a plurality of data transactions at a memory traffic scheduler, each of the plurality of data transactions associated with a transaction receipt time and a data transaction priority level;
   generate a plurality of metadata requests at the memory traffic scheduler, each of the plurality of metadata requests associated with one of the plurality of data transactions and a metadata priority level of a plurality of metadata priority levels inherited from the data transaction priority level of the one of the plurality of data transactions, each of the plurality of metadata priority levels associated with a metadata priority level weight; and
   schedule transmission of a first metadata request of the plurality of metadata requests to a memory controller based at least in part on a first metadata priority level associated with the first metadata request and a first bandwidth portion of a metadata request bandwidth, the first bandwidth portion associated with the first metadata priority level and allocated to metadata requests associated with the first metadata priority level based at least in part on a first metadata priority level weight associated with the first metadata priority level.

13. The machine-readable medium of claim 12, further comprising instructions to cause the machine to schedule transmission of a second metadata request of the plurality of metadata requests associated with a second data transaction to the memory controller based at least in part on a second metadata priority level associated with the second metadata request, a second time receipt associated with the second data transaction, and a second bandwidth portion of the metadata request bandwidth allocated for transmission of metadata requests associated with the second metadata priority level.

14. A system comprising:
   a plurality of cores;
   a memory controller;
   a metadata cache; and
   a memory traffic scheduler coupled to the plurality of cores, the memory controller, and the metadata cache, the memory traffic scheduler to:
      store a plurality of metadata requests, each of the plurality of metadata requests associated with one of a plurality of metadata priority levels;
      schedule transmission of a first metadata request of the plurality of metadata requests to the memory controller based at least in part on a first metadata priority level associated with the first metadata request and a first bandwidth portion of a metadata request bandwidth, the first bandwidth portion associated with the first metadata priority level;
      store a plurality of read data transactions, each of the plurality of read data transactions associated with one of a plurality of read data transaction priority levels; and
      schedule transmission of a first read data transaction of the plurality of read data transactions to the memory controller based at least in part on a first read data transaction priority level associated with the first read data transaction and a first bandwidth portion of a read data transaction bandwidth allocated for transmission of read data transactions to the memory controller, the first bandwidth portion of the read data transaction bandwidth allocated for transmission of read data transactions associated with the first read data transaction priority level.

15. The system of claim 14, wherein the memory traffic scheduler is further to:
   store a plurality of write data transactions, each of the plurality of write data transactions associated with one of a plurality of write data transaction priority levels; and
   schedule transmission of a write data transaction of the plurality of write data transactions to the memory controller based at least in part on a first write data transaction priority level associated with the first write data transaction and a first bandwidth portion of a write data transaction bandwidth allocated for transmission of write data transactions to the memory controller, the first bandwidth portion of the write data transaction bandwidth allocated for transmission of write data transactions associated with the first write data transaction priority level.

16. The system of claim 14, wherein the memory traffic scheduler comprises at least two metadata request queues, each of the at least two metadata request queues associated with one of the plurality of metadata priority levels, and the memory traffic scheduler is further to:
   generate the first metadata request associated with the first metadata priority level;
   place the first metadata request in a first metadata request queue associated with the first metadata priority level; and
   schedule transmission of the first metadata request to the memory controller based at least in part on a position of the first metadata request in the first metadata request queue.

17. The system of claim 16, wherein the memory traffic scheduler comprises a read data transaction queue and a write data transaction queue, and the memory traffic scheduler is further to:
   schedule transmission of a first read data transaction from the read data transaction queue to the memory controller based at least in part on a position of the first read data transaction in the read data transaction queue and a read data transaction bandwidth; and schedule transmission of a first write data transaction from the write data transaction queue to the memory controller based at least in part on a position of the first write data transaction in the write data transaction queue and a write data transaction bandwidth.

* * * * *